US011659517B2

(12) United States Patent
Sivavakeesar et al.

(10) Patent No.: US 11,659,517 B2
(45) Date of Patent: May 23, 2023

(54) MANAGING CONNECTION STATES FOR COMMUNICATIONS DEVICES

(71) Applicant: NEC Corporation, Tokyo (JP)

(72) Inventors: Sivapathalingham Sivavakeesar, Tokyo (JP); Robert Paterson, Tokyo (JP); Toshiyuki Tamura, Tokyo (JP); Sadafuku Hayashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/347,074

(22) PCT Filed: Oct. 26, 2017

(86) PCT No.: PCT/JP2017/038723
§ 371 (c)(1),
(2) Date: May 2, 2019

(87) PCT Pub. No.: WO2018/084070
PCT Pub. Date: May 11, 2018

(65) Prior Publication Data
US 2020/0037285 A1 Jan. 30, 2020

(30) Foreign Application Priority Data
Nov. 4, 2016 (GB) .................... 1618663

(51) Int. Cl.
H04W 68/00 (2009.01)
H04W 76/19 (2018.01)
(Continued)

(52) U.S. Cl.
CPC ......... H04W 68/005 (2013.01); H04W 76/19 (2018.02); H04W 76/27 (2018.02); H04W 36/0055 (2013.01); H04W 36/30 (2013.01)

(58) Field of Classification Search
CPC . H04W 76/27; H04W 72/042; H04W 68/005; H04W 76/11; H04W 80/02; H04W 76/19; H04W 76/30; H04W 36/0033
See application file for complete search history.

(56) References Cited

U.S. PATENT DOCUMENTS 8,619,799 B1 * 12/2013 Thodupunoori ...... H04W 68/02
370/401
9,071,635 B1 * 6/2015 Thodupunoori ...... H04L 43/062
(Continued)

FOREIGN PATENT DOCUMENTS

CN 102318419 A 1/2012
CN 104185278 A 12/2014
(Continued)

OTHER PUBLICATIONS

Communication dated Nov. 11, 2019 issued by the European Patent Office in counterpart application No. 17 797 769.1.
(Continued)

Primary Examiner — Margaret G Mastrodonato
(74) Attorney, Agent, or Firm — Sughrue Mion, PLLC

(57) ABSTRACT

A communication system is disclosed in which am anchor base station receives, from a core network node, downlink data for a communication device. The base station attempts (e.g. by RAN-based paging) to initiate communication with the communication device, and when the communication device does not respond to the attempt to initiate communication, the base station sends a message to the core network node, the message requesting initiation of a paging procedure for the communication device (e.g. S1-based paging).

8 Claims, 8 Drawing Sheets

(51) Int. Cl.
  *H04W 76/27*   (2018.01)
  *H04W 36/00*   (2009.01)
  *H04W 36/30*   (2009.01)

(56) References Cited

U.S. PATENT DOCUMENTS

| | | | |
|---|---|---|---|
| 9,125,129 | B2 | 9/2015 | Hung |
| 11,259,359 | B2* | 2/2022 | Kim ..................... H04W 76/30 |
| 11,405,974 | B2 | 8/2022 | Sivavakeesar |
| 11,412,565 | B2 | 8/2022 | Sivavakeesar et al. |
| 2011/0268085 | A1 | 11/2011 | Barany et al. |
| 2012/0269167 | A1* | 10/2012 | Velev ............... H04W 36/0011 370/331 |
| 2013/0039287 | A1 | 2/2013 | Rayavarapu et al. |
| 2013/0260811 | A1* | 10/2013 | Rayavarapu .......... H04W 76/19 455/509 |
| 2015/0173121 | A1* | 6/2015 | Miklos ................. H04W 76/38 370/329 |
| 2015/0223284 | A1* | 8/2015 | Jain ........................ H04B 5/00 370/329 |
| 2016/0135247 | A1 | 5/2016 | Ozturk et al. |
| 2017/0064601 | A1* | 3/2017 | Kubota ................ H04W 48/18 |
| 2017/0202050 | A1 | 7/2017 | Deng |
| 2017/0202051 | A1 | 7/2017 | Hwang |
| 2017/0311278 | A1* | 10/2017 | Adjakple ............. H04W 60/00 |
| 2018/0020382 | A1* | 1/2018 | Kim .................. H04W 36/0055 |
| 2018/0092060 | A1* | 3/2018 | Won .................. H04W 74/004 |
| 2018/0098311 | A1* | 4/2018 | Hong ................ H04W 72/0406 |
| 2018/0206248 | A1* | 7/2018 | Zhang .................. H04W 76/27 |
| 2018/0368196 | A1* | 12/2018 | Gage .................... H04W 76/12 |
| 2019/0052607 | A1 | 2/2019 | Ohlsson et al. |
| 2019/0174570 | A1* | 6/2019 | Fujishiro ............... H04W 68/00 |
| 2019/0320476 | A1 | 10/2019 | Wang et al. |
| 2019/0357296 | A1 | 11/2019 | Ohlsson et al. |

FOREIGN PATENT DOCUMENTS

| | | |
|---|---|---|
| CN | 104244346 A | 12/2014 |
| EP | 3 082 366 A1 | 10/2016 |
| EP | 3 484 235 A1 | 5/2019 |
| KR | 10-2015-0058187 A | 5/2015 |
| RU | 2 474 084 C2 | 1/2013 |
| RU | 2 509 449 C9 | 3/2014 |
| WO | 2014/021770 A2 | 2/2014 |
| WO | 2017/006265 A1 | 1/2017 |
| WO | 2018/030304 A1 | 2/2018 |
| WO | 2018/056347 A1 | 3/2018 |

OTHER PUBLICATIONS

NGMN 5G White Paper, V1.0 by the Next Generation Mobile Networks (NGMN) Alliance, 125 pages, https://www.ngmn.org/5g-white-paper.html.
3GPP TS 36.331 V14.0.0, 3rd Generation Partnership Project; Technical Specification Group Radio Access Network; Evolved Universal Terrestrial Radio Access (E-UTRAN); Radio Resource Control (RRC), Protocol specification (Release 14), Sep. 2016, pp. 1-644.
"General consideration on light connection", Huawei, China Telecom, 3GPP TSG-RAN WG3 Meeting #91 bis, R3-160655, Bangalore, India, Apr. 11-14, 2016, pp. 1-3.
"State transition and small data transmissions for inactive UEs", Ericsson, 3GPP TSG-RAN WG2 #95, R2-165538, Gothenburg, Sweden, Aug. 22-26, 2016, pp. 1-5.
"On common and Specific building blocks for Light connected UEs", Ericsson, 3GPP TSG-RAN WG3 Meeting #93bis, R3-162432, Sophia Antipolis, France, Oct. 10-14, 2016, pp. 1-10.
"Response to R3-162156", NTT Docomo, Inc, 3GPP TSG-RAN WG3 Meeting #93bis, R3-162490, Sophia Antipolis, France, Oct. 10-14, 2016, pp. 1-4.
"Procedures for moving within RAN based Paging Area", Huawei, China Telecom, 3GPP TSG-RAN3 Meeting #93bis, R3-162156, Sophia-Antipolis, France, Oct. 10-14, 2016, pp. 1-3.
"Common and specific building blocks for light connected UEs", Ericsson, 3GPP TSG-RAN WG2 #95bis, R2-166953, Kaohsiung, Taiwan, Oct. 10-14, 2016, pp. 1-8.
"Signalling flows for paging and resume for inactive state", Ericsson, 3GPP TSG-RAN WG2 #95bis, R2-166920, Kaohsiung, Taiwan, Oct. 10-14, 2016, pp. 1-7.
"Discussion on paging area update failure for lighted connected UE", ITRI, 3GPP TSG RAN WG2 #95bis, R2-166500, Kaohsiung, Oct. 10-14, 2016, pp. 1-2.
"Introduction of Light Connected state", Nokia, Alcatel-Lucent Shanghai Bell, Huawei, 3GPP TSG-RAN WG3 Meeting #93bis, R3-162559, Sophia Antipolis, France, Oct. 10-14, 2016, pp. 1-15.
"Introduction of the light connected mode", Ericsson, 3GPP TSG-RAN WG3 Meeting #93bis, R3-162556, Sophia Antipolis, France, Oct. 10-14, 2016, pp. 1-10.
"Introduction of the light connected mode", Ericsson, 3GPP TSG-RAN WG3 Meeting #93bis, R3-162557, Sophia Antipolis, France, Oct. 10-14, 2016, pp. 1-28.
British Search Report for 1618663.7 dated Mar. 29, 2017.
International Search Report for PCT/JP2017/038723 dated Mar. 26, 2018 [PCT/ISA/210].
Communication dated Jan. 20, 2020 by the Russian Patent Office in application No. 2019117048/08.
Samsung, "Analysis of the paging area change scenario with No. X2 interface", 3GPP TSG-RAN WG2 #95bis, R2-166064, Kaohsiung, Taiwan, Oct. 10-14, 2016, 6 pages total.
Communication dated Apr. 24, 2020, from the Korean Intellectual Property Office in Application No. 10-2019-7015370.
Catt, "Discussion on open issues for LC", 3GPP TSG RAN WG3 Meeting #94 R3-162702, Reno, USA, Nov. 14-18, 2016 (6 pages total).
Notice of Reasons for Refusal dated Jun. 9, 2020, from the Japanese Patent Office in Application No. 2019-522595.
Chinese Office Action for CN Application No. 201780082109.6 dated Jun. 17, 2021 with English Translation.
Indian Office Action for IN Application No. 20211805675 dated May 25, 2022.
Korean Office Action for KR Application No. 10-2022-7010155 dated Jun. 23, 2022 with English Translation,.
Huawei et al., "Evaluation on RAN initiated paging and MME initiated paging", 3GPP TSG RAN WG2 #94, R2-163930, May 13, 2016.
Korean Office Action for KR Application No. 10-2022-7010156 dated Jun. 23, 2022 with English Translation.
Huawei et al., "Mobility notification for the lightly connected UE", 3GPP TSG RAN WG2 #95, R2-165247, Aug. 12, 2016.
U.S. Office Action for U.S. Appl. No. 17/689,151, dated on Dec. 22, 2022.

* cited by examiner

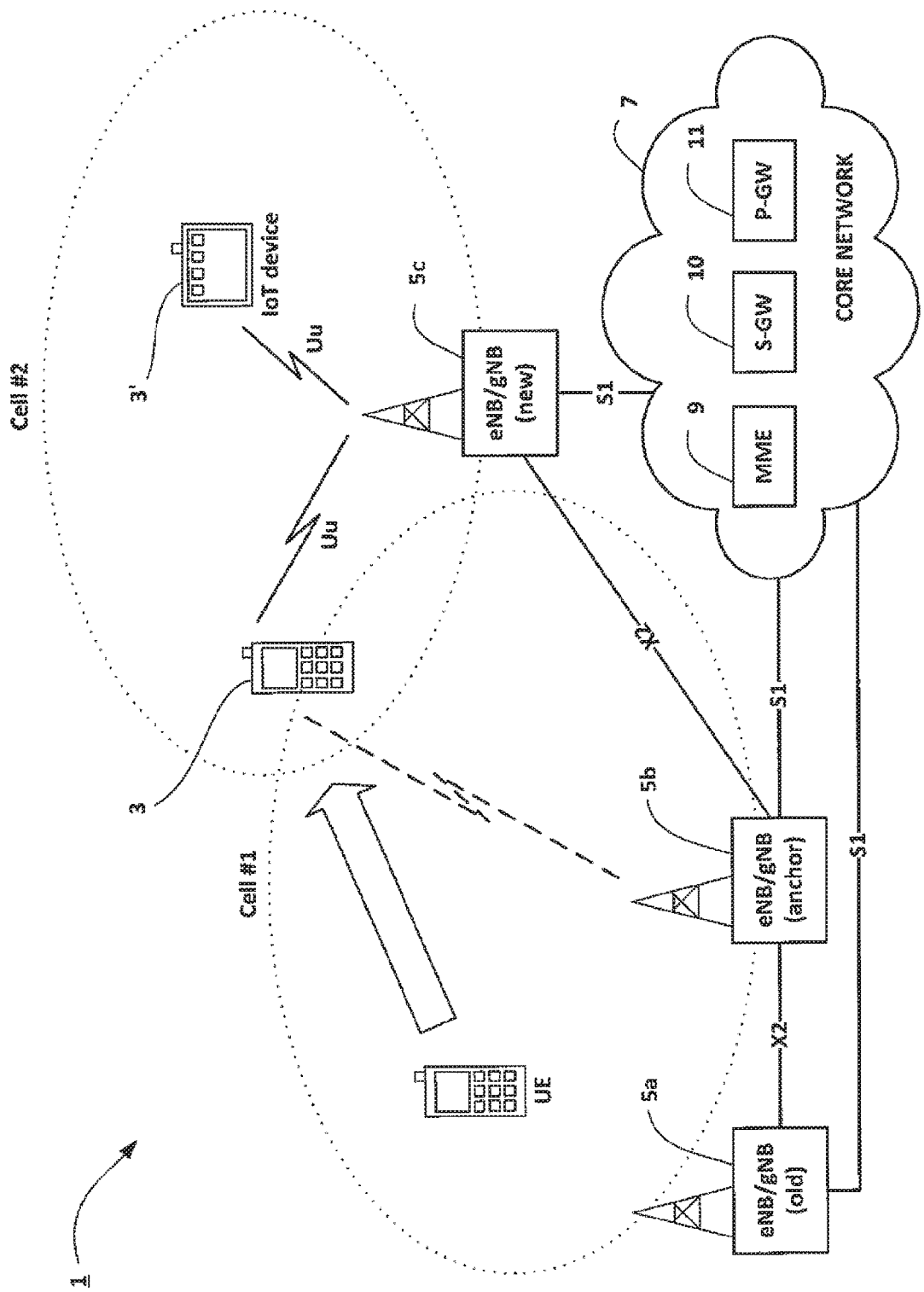
[Fig. 1]

[Fig. 2]
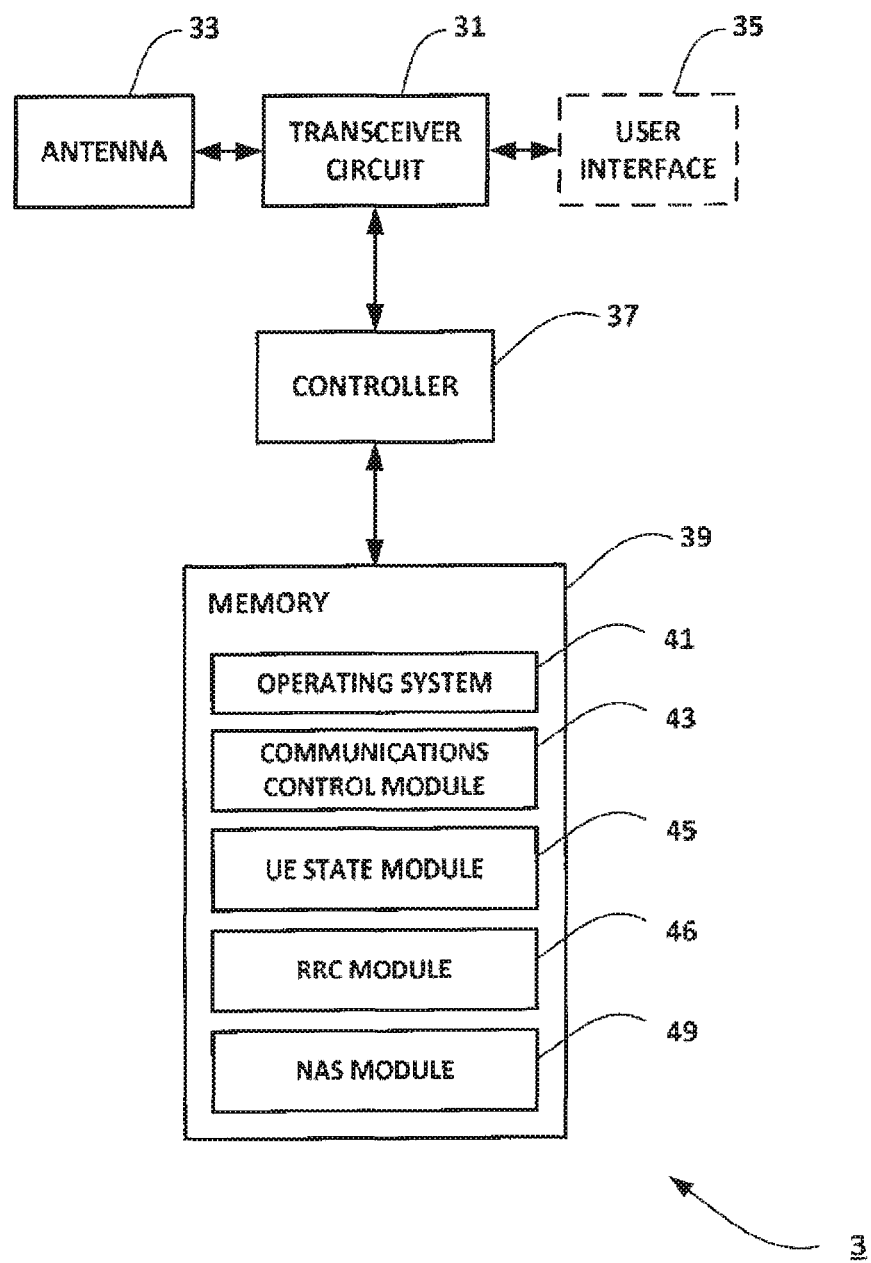

[Fig. 3]
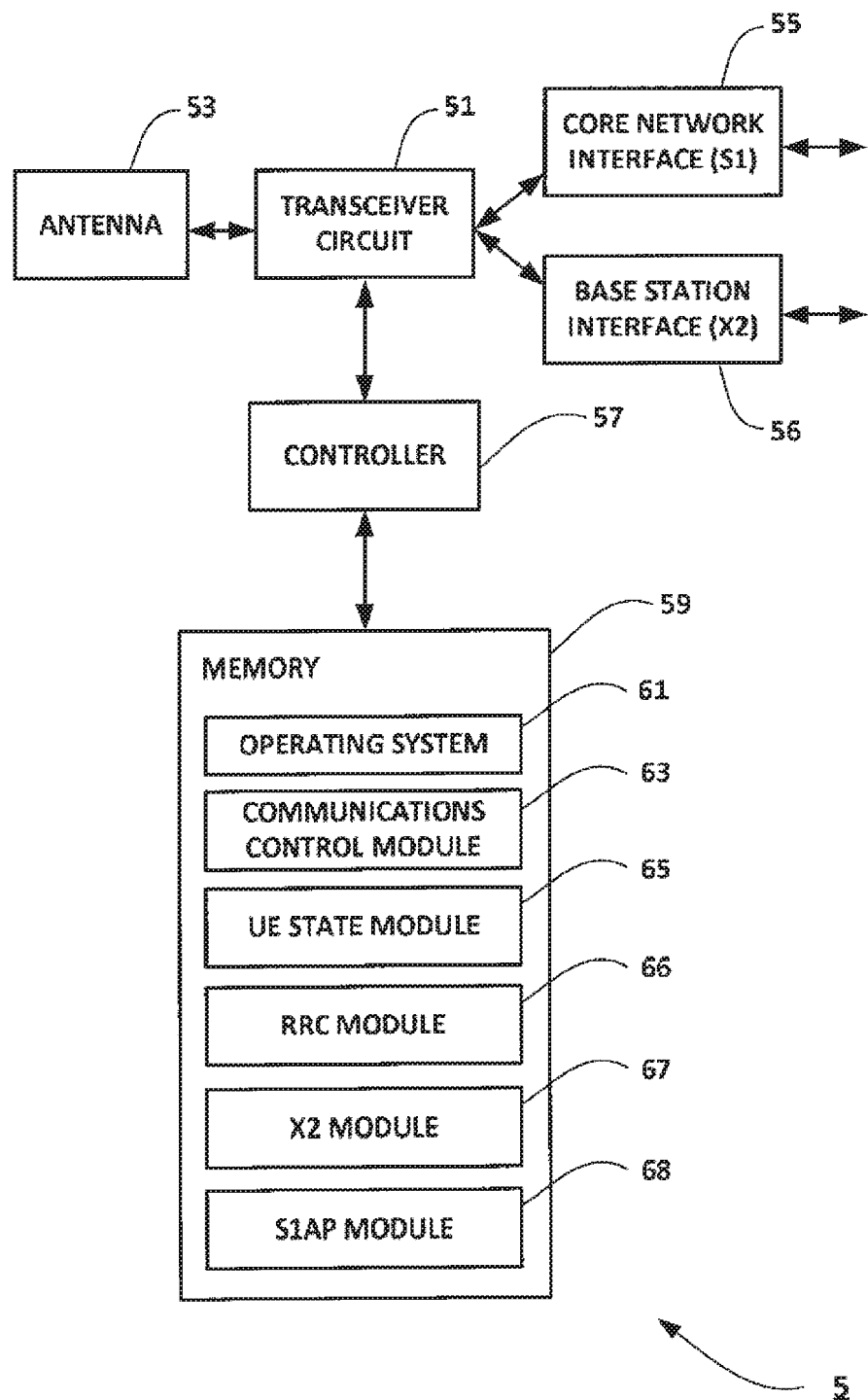

[Fig. 4]
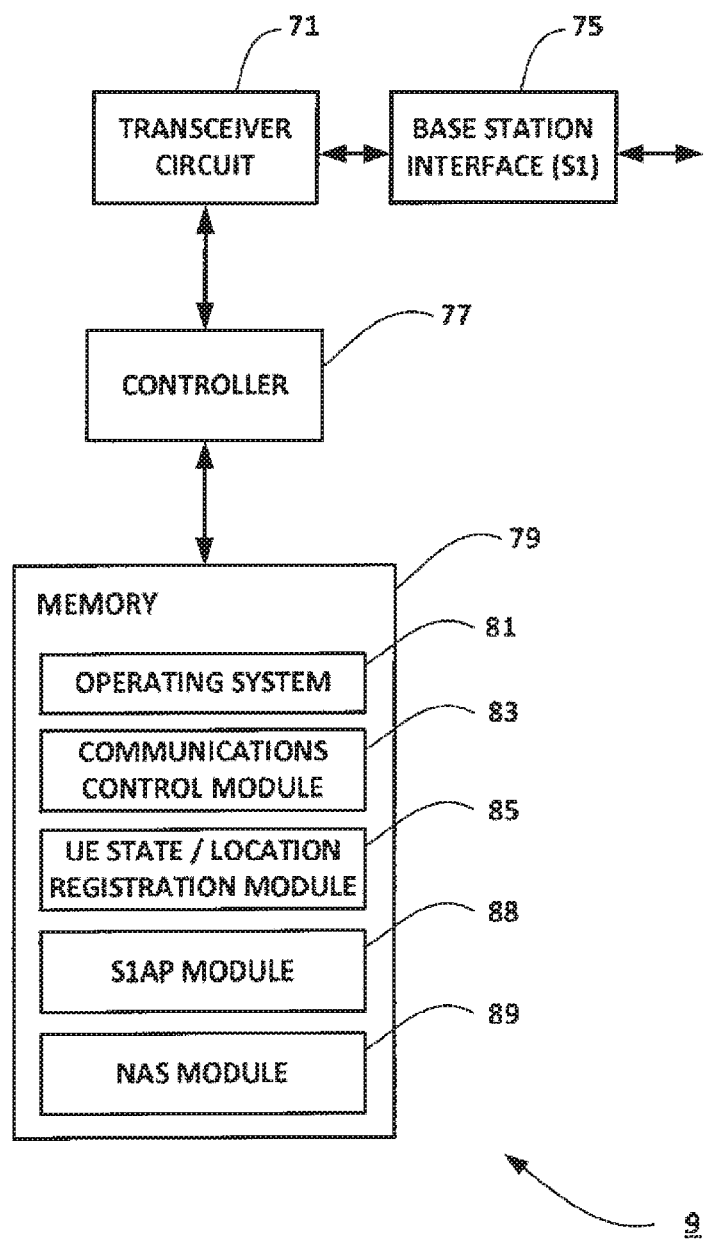

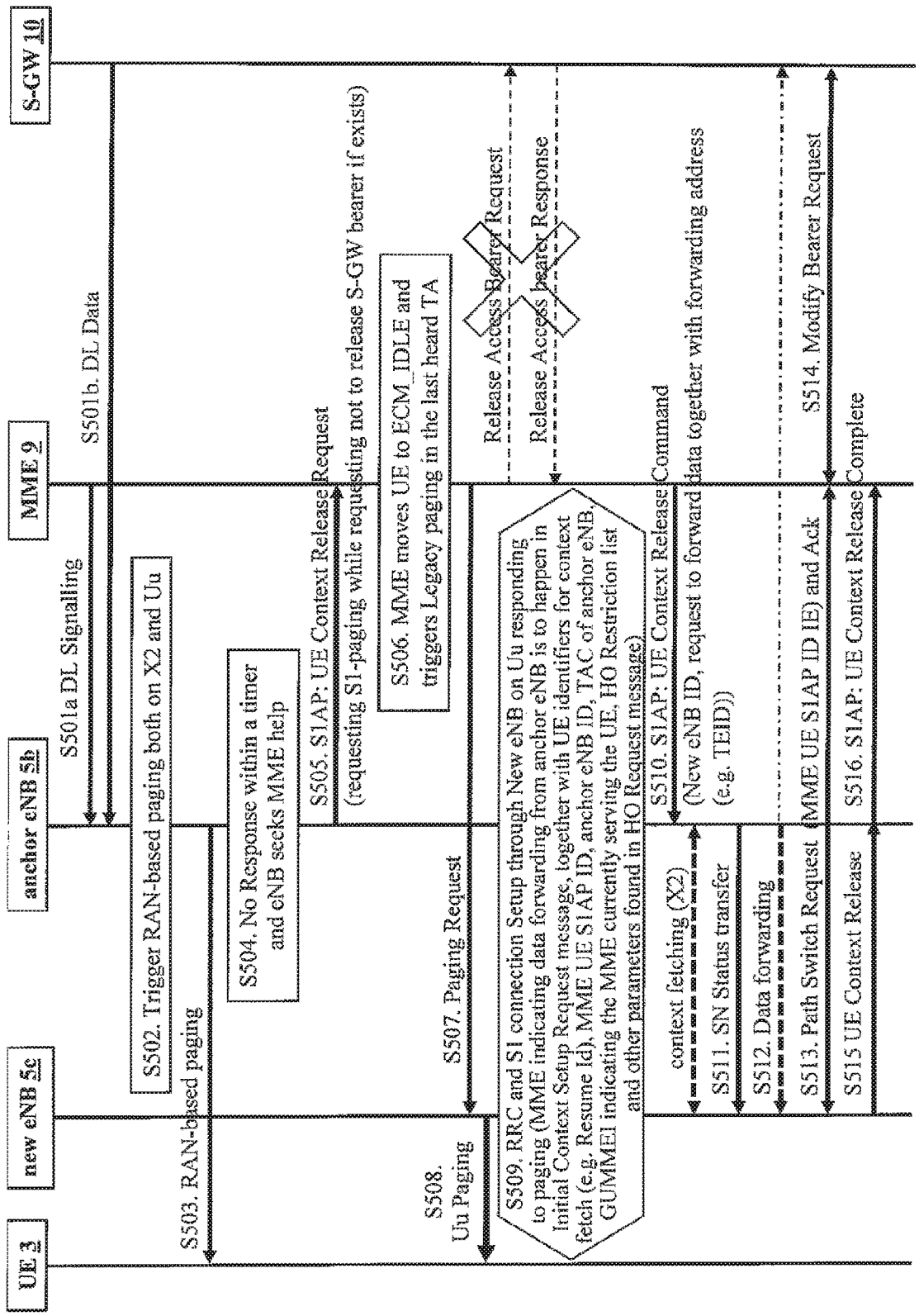

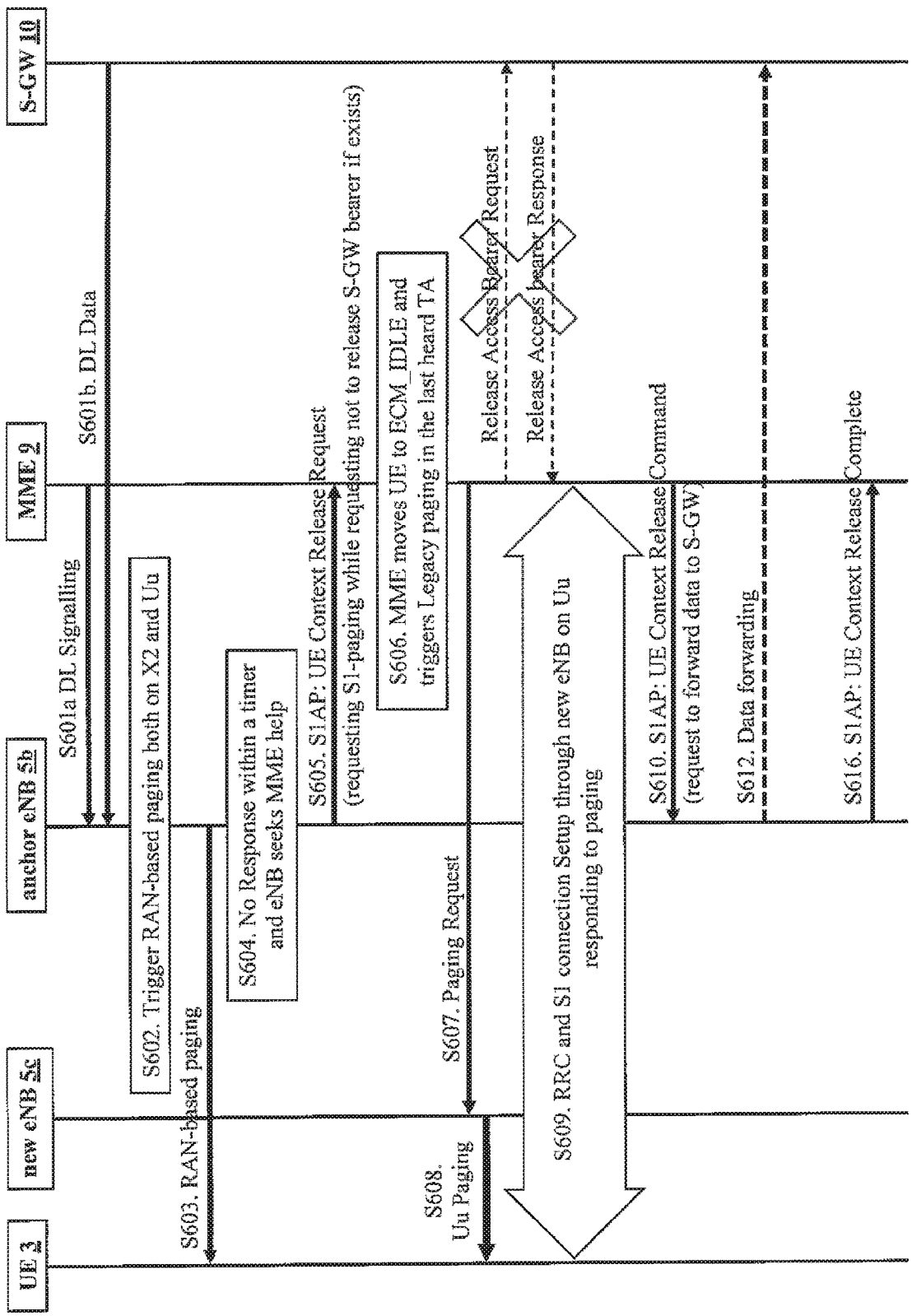

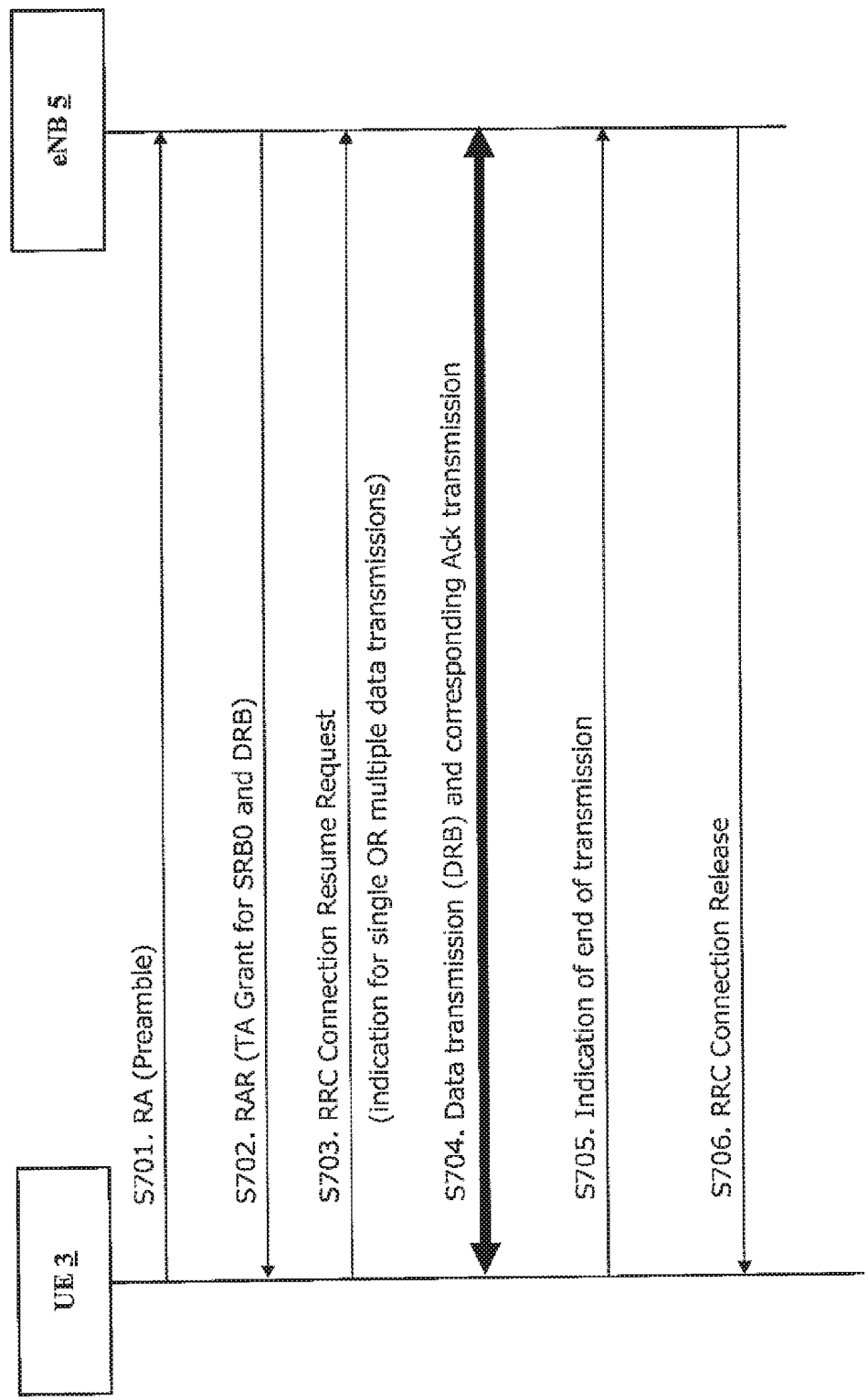
[Fig. 7]

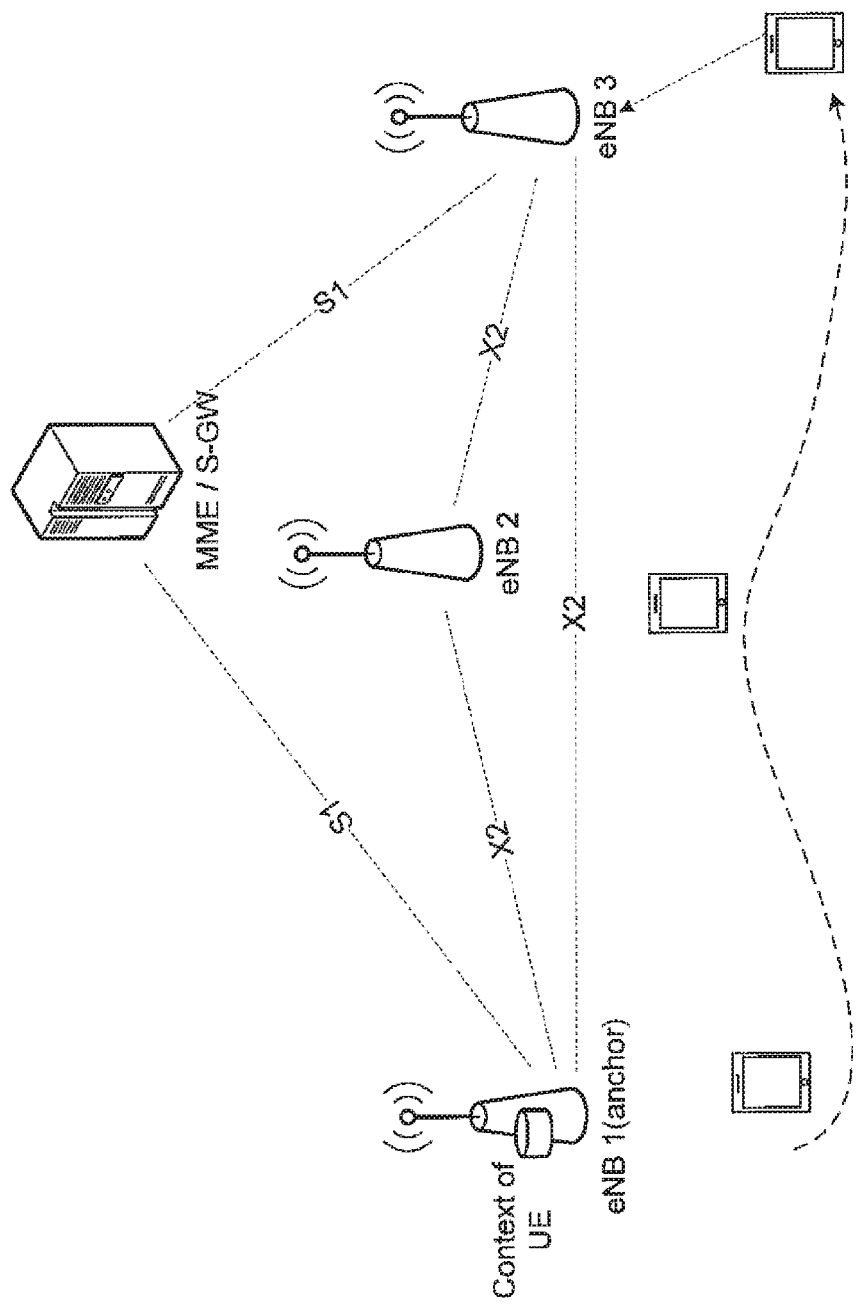

MANAGING CONNECTION STATES FOR COMMUNICATIONS DEVICES

CROSS REFERENCE TO RELATED APPLICATIONS

This application is a National Stage of International Application No. PCT/JP2017/038723, filed on Oct. 26, 2017, which claims priority from British Patent Application No. 1618663.7, filed on Nov. 4, 2016, the contents of all of which are incorporated herein by reference in their entirety.

TECHNICAL FIELD

The present invention relates to a communication system. The invention has particular but not exclusive relevance to wireless communication systems and devices thereof operating according to the 3rd Generation Partnership Project (3GPP) standards or equivalents or derivatives thereof (including LTE-Advanced and Next Generation or 5G networks). The invention has particular although not exclusive relevance to managing connection states for communication devices.

BACKGROUND ART

The latest developments of the 3GPP standards are referred to as the Long Term Evolution (LTE) of Evolved Packet Core (EPC) network and Evolved UMTS Terrestrial Radio Access Network (E-UTRAN), also commonly referred as '4G'. In addition, the term '5G' and 'new radio' (NR) refer to an evolving communication technology that is expected to support a variety of applications and services. Various details of 5G networks are described in, for example, the 'NGMN 5G White Paper' V1.0 by the Next Generation Mobile Networks (NGMN) Alliance, which document is available from https://www.ngmn.org/5g-white-paper.html. 3GPP intends to support 5G by way of the so-called 3GPP Next Generation (NextGen) radio access network (RAN) and the 3GPP NextGen core network.

Under the 3GPP standards, a NodeB (or an eNB in LTE, gNB in 5G) is the base station via which communication devices (user equipment or 'UE') connect to a core network and communicate to other communication devices or remote servers. For simplicity, the present application will use the term base station to refer to any such base stations and use the term mobile device, user device, or UE to refer to any such communication device. The core network (i.e. the EPC in case of LTE) hosts functionality for subscriber management, mobility management, charging, security, and call/session management (amongst others), and provides connection for communication devices to external networks, such as the Internet.

Communication devices might be, for example, mobile communication devices such as mobile telephones, smartphones, user equipment, personal digital assistants, laptop/tablet computers, web browsers, e-book readers and/or the like. Such mobile (or even generally stationary) devices are typically operated by a user. However, 3GPP standards also make it possible to connect so-called 'Internet of Things' (IoT) devices (e.g. Narrow-Band IoT (NB-IoT) devices) to the network, which typically comprise automated equipment, such as various measuring equipment, telemetry equipment, monitoring systems, tracking and tracing devices, in-vehicle safety systems, vehicle maintenance systems, road sensors, digital billboards, point of sale (POS) terminals, remote control systems and the like. Effectively, the Internet of Things is a network of devices (or "things") equipped with appropriate electronics, software, sensors, network connectivity, and/or the like, which enables these devices to collect and exchange data with each other and with other communication devices. It will be appreciated that IoT devices are sometimes also referred to as Machine-Type Communication (MTC) communication devices or Machine-to-Machine (M2M) communication devices.

For simplicity, the present application refers to mobile devices in the description but it will be appreciated that the technology described can be implemented on any communication devices (mobile and/or generally stationary) that can connect to a communications network for sending/receiving data, regardless of whether such communication devices are controlled by human input or software instructions stored in memory.

Communication between mobile devices and base stations is controlled using a Radio Resource Control (RRC) protocol as defined in 3GPP TS 36.331 V14.0.0, RRC handles the control plane signalling of Layer 3 between mobile telephones and the radio access network, and includes, amongst other things, functions for broadcasting system information, paging, connection establishment and release, radio bearer establishment, reconfiguration and release, mobility procedures, and power control. In accordance with the current version of the RRC protocol, at any given time, a mobile device may operate either in an 'RRC idle mode' (in which no data communication takes place) or an 'RRC connected mode' (in which data communication may take place between the mobile device and its serving base station).

As mobile devices operating in the RRC connected mode move around in the area covered by the communication system, they are handed over from one cell (i.e. operated by a base station) to another cell (operated by the same or a different base station), depending on signal conditions and other requirements, such as requested quality of service, the type of service used, overall system load, and the like. Handover requires extensive signalling between the mobile device and the base stations (old and new) and also between the base stations and the core network as well.

On the other hand, whilst in the RRC idle mode, mobile devices are programmed to select a 'serving' cell, having a good quality signal, to camp on so that when new data is to be transmitted to/from these mobile devices, they can benefit from favourable signal conditions. In the event that an idle mobile device detects a new cell with better signal quality than the current serving cell, e.g. due to the mobile device changing its location, the mobile device can perform a so-called cell reselection procedure. However, an idle mode mobile device does not inform the network about the selected new cell as long as this cell is within the same 'tracking area' (i.e. a larger geographic area comprising a pre-defined set of cells), because the radio network transmits system information and UE specific paging messages within the whole tracking area thus making it possible to initiate communication to/from the mobile device regardless of the current cell it camps on.

In order to benefit from the lowest energy consumption and to free up valuable system resources, the mobile devices return to the RRC idle mode whenever possible and perform cell reselections (instead of handovers) as long as they remain within the same tracking area. The base station controls the transition between the various operating modes for each mobile device within its cell(s). Since the setting up and termination of an RRC connection between the base station and the mobile device requires exchanging of signalling messages and hence utilises valuable system resources, and also takes some time to complete, the transition from connected to idle mode is allowed under specific circumstances as defined in 3GPP TS 36.331. For example, the serving base station might instruct a mobile device to enter the RRC idle mode only after it has confirmed that there is no more data to be transmitted to/from the particular mobile device (e.g. both uplink (UL) and downlink (DL) buffers are empty).

When it registers its current location (e.g. cell) with the core network, each mobile device also has an associated 'S1' connection between its serving base station and the core network. The S1 connection is either in a so-called 'ECM-IDLE' mode (when the mobile device is in RRC idle mode) or in an 'ECM-CONNECTED' mode (when the mobile device is in RRC connected mode). The S1 connection is used for transferring data (control and user data) between the mobile device and the core network (and beyond) and it is maintained as long as the mobile device remains in the RRC connected mode. On the other hand, when a mobile device enters the RRC idle mode, its associated S1 connection is also terminated (or suspended) until the mobile device has more data to send or receive in which case a new S1 connection is established to the current serving base station (or the suspended S1 connection is re-activated).

When the network has data to send to an RRC idle mobile device, it triggers an appropriate paging procedure in the last known area (tracking/paging area) of the mobile device, which causes the base stations within that area to broadcast appropriate paging messages in their cells requesting that particular mobile device to enter the RRC connected state. When a previously idle mobile telephone has data to send again (or it has been paged for receiving downlink data), in order to be allocated communication resources it initiates a so called RRC connection establishment procedure by sending an appropriately formatted RRC connection request message to the base station (following a so-called Random Access Procedure which ensures that the lower layers, and in particular the Media Access Control (MAC) layer, are set up for communication with the base station).

For the latest developments of the 3GPP standards, the so-called Next Generation (NG) or 5G networks, it is envisaged that mobile devices may also operate in a new RRC state, or new radio state, referred to as a 'light-connected' (LC) state. When a mobile device is in the LC state, the core network maintains both its control-plane and user-plane connection even after the mobile device has no more data to send or receive (and hence it is normally configured to enter the RRC idle mode). In other words, even though in the LC state the mobile device is seen as operating in idle mode from the radio access network's (base station's) point of view, it may still be seen as being connected from the core network's point of view. One of the benefits of this new LC state is that mobile devices (IoT devices in particular) that have small and infrequent data transmissions do not need to perform the entire RRC connection establishment procedure every time they have data to send (or receive). Instead, an LC state capable mobile device can be configured to resume its existing RRC connection with the current serving base station whenever needed and then return to a more power efficient mode of operation until it has data to send/receive again.

The mobile device can resume its RRC connection by sending to its current base station information (e.g. a resume ID) identifying the connection to be resumed. This beneficially avoids the base station and the mobile device having to go through authentication and radio bearer establishment.

In order to facilitate such lightweight connection and simplified resumption of the connection between the mobile device and its serving base station, the concept of a so-called anchor base station is being considered by 3GPP. Effectively, the anchor base station is a base station responsible for storing UE Access Stratum (AS) context, caching the mobile device's user data (UE context) and for providing the user data to other base stations as needed while terminating S1. For example, the anchor base station may be the first (or previous) base station that the mobile device registered with in a particular tracking area (or other pre-defined area). Thus, when the mobile device attempts to resume its RRC connection via a different base station (within the same area), the new base station can contact the anchor base station and retrieve the UE context along with the cached user data based on information provided by the mobile device (e.g. resume ID and/or the like). Since in the LC state the S1 connection is maintained, beneficially, the new base station can avoid having to contact the core network and/or establish a new S1 connection for the mobile device (although the new base station might need to switch the S1 connection from the anchor/previous base station to the new base station). The anchor base station concept is illustrated in FIG. 8 which is reproduced from 3GPP draft no. R3-160655.

The current agreement in 3GPP is that the base station maintains the S1 connection while the mobile device is lightly connected and the base station is responsible for RAN paging (within an appropriate paging/tracking area configured by the base station) when it receives the downlink data from core network. The LC state mobile device notifies the network when it moves out of its configured RAN based paging area, in which case the network can decide whether to keep the mobile device in LC mode or suspend the mobile device (e.g. request it to enter RRC idle mode).

SUMMARY OF INVENTION

Technical Problem

However, the inventors have realised that since the mobile device appears to be in different states towards the RAN and the core network, this may cause a number of issues that the currently proposed systems cannot handle. Such issues include, although they are not limited to:

how to avoid loss of DL data when RAN based paging fails;

how to perform core network (e.g. MME) based paging as a fall-back when RAN based paging fails;

how to inform a mobility management entity (MME) that certain operations such as load balancing, tracking area update (TAU) required, power saving mode (PSM), mobile terminated (MT) circuit switched fallback (CSFB) may be impacted due to the mobile device's LC operation.

how to notify the MME when a mobile device enters the LC state;

how to exchange a RAN-based identifier (e.g. resume ID) that is used to uniquely identify a mobile device when it is in LC mode within the RAN routing area (e.g. for reducing the time it takes to resume a connection by performing context pre-fetch);

how to expedite random access channel (RACH) processes when a mobile device transits from LC mode to regular connected mode for data transmission;

how to synchronise RAN location update with core network location update; and how to enable UL data transmission when the mobile device is in LC mode.

Accordingly, preferred example embodiments of the present invention aim to provide methods and apparatus which address or at least partially deal with one or more of the above issues whilst still allowing mobile devices to maintain a light connection with the network.

Although for efficiency of understanding for those of skill in the art, the invention will be described in detail in the context of a 3GPP system (UMTS, LTE), the principles of the invention can be applied to other systems in which communication devices or User Equipment (UE) access a core network using a radio access technology.

Solution to Problem

In one aspect, the invention provides a base station for a communication network, the base station comprising: a transceiver and a controller wherein the controller is configured to: control the transceiver to receive, from a core network node, downlink data for a communication device; attempt to initiate communication with the communication device; and control the transceiver to send to the core network node, when the communication device does not respond to said attempt to initiate communication, a message to request initiation of a paging procedure for the communication device.

In one aspect, the invention provides core network apparatus for a communication network, the core network apparatus comprising: a transceiver and a controller wherein the controller is configured to: control the transceiver to send, to a base station, downlink data for a communication device; control the transceiver to receive front the base station, when the communication device does not respond to an attempt by the base station to initiate communication, a message to request initiation of a paging procedure for the communication device; and initiate a paging procedure for the communication device based on said message.

In one aspect, the invention provides a base station for a communication network, the base station comprising: a transceiver and a controller wherein the controller is configured to: control the transceiver to send a notification to a core network node indicating that at least one core network operation is not possible (or banned) for a given communication device.

In one aspect, the invention provides a base station for a communication network, the base station comprising: a transceiver and a controller wherein the controller is configured to: maintain information identifying at least one communication device, for which the base station operates as an anchor base station, in association with respective context information for each communication device for which the base station operates as an anchor base station; and control the transceiver to provide to another base station at least one identifier to identify at least one respective communication device for which the base station operates as an anchor base station.

In one aspect, the invention provides a base station for a communication network, the base station comprising: a transceiver and a controller wherein the controller is configured to: control the transceiver to receive from at least one other base station at least one identifier to identify at least one communication device for which the at least one other base station operates as an anchor base station; and fetch, from the at least one other base station, context information for each communication device for which the at least one other base station operates as an anchor base station based on said at least one identifier.

In one aspect, the invention provides a base station for a communication network, the base station comprising: a transceiver and a controller wherein the controller is configured to: control the transceiver to, receive from a core network node, a message indicating that data forwarding from another base station is to happen for a communication device, together with at least one of: an identifier, associated with that communication device, for use in fetching a context relating to that communication device from the other base station; information identifying the communication device at the core network node over an S1 interface (e.g. 'MME UE S1AP ID'); information identifying the other base station (e.g. an 'anchor eNB ID'); a tracking area code (TAC) associated with the other base station; a globally unique ID (e.g. a GUMMEI) associated with the core network node currently serving the communication device; information identifying at least one cell identifier for at least one cell to which a handover of the communication device is prohibited; and at least one other parameter acquired by the core network node in a previously handled handover request relating to the communication device; and control the transceiver to receive data forwarded by the other base station accordingly.

Aspects of the invention extend to corresponding systems, methods, and computer program products such as computer readable storage media having instructions stored thereon which are operable to program a programmable processor to carry out a method as described in the aspects and possibilities set out above or recited in the claims and/or to program a suitably adapted computer to provide the apparatus recited in any of the claims.

Each feature disclosed in this specification (which term includes the claims) and/or shown in the drawings may be incorporated in the invention independently of (or in combination with) any other disclosed and/or illustrated features. In particular but without limitation the features of any of the claims dependent from a particular independent claim may be introduced into that independent claim in any combination or individually.

Example embodiments of the invention will now be described, by way of example, with reference to the accompanying drawings in which:

BRIEF DESCRIPTION OF DRAWINGS

FIG. 1 illustrates schematically a cellular telecommunication system to which example embodiments of the invention may be applied;

FIG. 2 is a block diagram of a mobile device forming pail of the system shown in FIG. 1;

FIG. 3 is a block diagram of a base station forming part of the system shown in FIG. 1;

FIG. 4 is a block diagram of a mobility management entity forming part of the system shown in FIG. 1;

FIG. 5 is a timing diagram illustrating an exemplary way in which example embodiments of the invention can be implemented in the system of FIG. 1;

FIG. 6 is a timing diagram illustrating an exemplary way in which example embodiments of the invention can be implemented in the system of FIG. 1;

FIG. 7 is a timing diagram illustrating an exemplary way in which example embodiments of the invention can be implemented in the system of FIG. 1; and FIG. 8 illustrates schematically the anchor base station concept.

DESCRIPTION OF EMBODIMENTS

Overview

FIG. 1 schematically illustrates a telecommunications network 1 in which mobile devices 3, mobile telephones, and other communication devices (e.g. IoT devices) can communicate with each other via E-UTRAN base stations 5 and a core network 7 using an E-UTRA radio access technology (RAT). As those skilled in the art will appreciate, whilst one mobile device 3 (denoted 'UE'), one IoT device 3', and three base stations 5a to 5c are shown in FIG. 1 for illustration purposes, the system, when implemented, will typically include other base stations and communication devices.

Each base station 5 operates one or more associated cell. In this example, the base station 5b operates 'Cell #1' and the base station 5c operates 'Cell #2'. Although not shown in FIG. 1, base station 5a will also typically operate one or more cells. It will also be appreciated that in some scenarios the 'old' base station 5a and the 'anchor' base station 5b might be the same.

Communication devices may connect to either cell (depending on their location and possibly on other factors, e.g. signal conditions, subscription data, capability, and/or the like) by establishing a radio resource control (RRC) connection with the appropriate base station 5 operating that cell. As can be seen, the mobile device 3 is located in an area where the cells operated by the base stations 5b and 5c partially overlap. Thus, when operating in RRC idle mode (not sending/receiving data), the mobile device 3 camps on the cell having the best signal quality, and when in RRC active mode, the mobile device 3 communicates data via that cell (using e.g. the 'Uu' air interface). Similarly, in this example, the IoT device 3' camps on Cell #2 (when in RRC idle mode) and communicates via the base station 5c (when in RRC active mode).

When the mobile device 3 (IoT device 3') first registers with the network (via one of the base stations 5), its serving base station 5 also establishes an associated S1 connection for relaying communications (user and control data) between the serving base station 5 and the core network 7.

The base stations 5 are connected to the core network 7 via an S1 interface and to each other via an X2 interface (either directly, or via an X2 gateway). The core network 7 includes, amongst others, a mobility management entity (MME) 9, a serving gateway (S-GW) 10, and a packet data network gateway (P-GW) 11 for providing a connection between the base stations 5 and other networks (such as the Internet) and/or servers hosted outside the core network 7.

The MME 9 is the network node responsible for keeping track of the locations of the mobile communication devices (mobile devices and IoT devices alike) within the telecommunications network 1 especially when a UE is RRC_IDLE mode. In particular, the MME 9 stores an identifier of the mobile communication devices' last known cell (or tracking area) so that they can be notified when there is an incoming (voice or data) call for them and that a communication path is set up via the base station 5 currently serving the particular mobile communication device.

In the following examples, the mobile device 3 connects to the network periodically (e.g. whenever one of its applications needs to communicate with the network) for sending data to a remote endpoint (e.g. a server or another communication device). The mobile device 3 is configured to operate in a light connected (LC) mode in which the network maintains an associated S1 connection even when the mobile device 3 is operating in an idle mode from the RAN's point of view. Therefore, between its periodic re-connections, the mobile device 3 effectively enters an idle (or 'suspended') mode and thus avoids performing handovers as long as it remains within an area configured by its anchor base station.

The serving base station 5 is responsible for configuring an appropriate RAN based paging area for the mobile device 3 (e.g. by providing a list of cells and/or paging area IDs to the mobile device 3). The RAN based paging area may be configured as one or more cells from the same or different base stations 5. For example, the RAN based paging area may be a tracking area.

As illustrated by a dashed line, the mobile device 3 previously connected to the base station 5b (via Cell #1) and thus the base station 5b (acting as the anchor base station for the mobile device 3) maintains an associated UE context and terminates S1. However, it will also be appreciated that the anchor base station may be a different base station, e.g. the old base station 5a. In the present example, the anchor base station 5b configures the mobile device 3 with a RAN paging area that includes the anchor base station's own cell (Cell #1) and any cells operated by base station 5a.

As illustrated by a continuous line, the mobile device 3 is now reachable via the base station 5c (via Cell #2), e.g. due to a change in signal conditions in Cell #1 and/or movement of the mobile device 3. In this example, the mobile device 3 currently has no active connections with the radio access network (the base stations 5), thus it is configured to perform cell reselection when it moves to Cell #2 (without informing the network).

As explained above, in LC state the mobile device 3 is still seen as connected (ECM-CONNECTED) from the core network's 7 (MME 9) point of view even after the mobile device 3 has, in effect, entered an idle mode from the perspective of the base stations (and hence the mobile device 3 does not have an active data connection with its base station 5). Accordingly, when there is downlink data to send, the MME 9 does not initiate paging, for a mobile device 3 in the LC state/mode (e.g. throughout an associated tracking/paging area) because the MME 9 assumes that the mobile device 3 still has an active connection with its serving base station 5 (in this example, the anchor base station 5b). Thus, the MME 9 starts sending the downlink data to the anchor base station 5b. In response to the downlink data, the anchor base station 5b starts appropriate procedures for (RAN based) paging of the mobile device 3 within the paging area appropriate for that mobile device 3. The RAN based paging indicates to the mobile device 3 that it needs to resume its RRC connection (re-connect) via an appropriate base station for receiving downlink data. Until the mobile device 3 resumes its connection, the anchor base station 5b stores the downlink data from the MME 9 (in case of control-planes signalling or data) or from the S-GW 10 (in case of user-plane data) in its cache (memory).

The base station 5b decides which cells to page when it receives the downlink data. If necessary, the anchor base station 5b may send appropriate X2 paging signalling to its neighbour base station(s) in order to reach the mobile device 3 via other than its own cell(s). However, as the mobile device 3 has moved in the meantime and it is now camping on Cell #2, it might not be able to receive (or respond to) the paging signalling. This might happen, for example, when the anchor base station 5b does not perform paging via its neighbours (even though Cell #2 may belong to the currently configured RAN paging area), when Cell #2 does not belong to the paging area configured for the mobile device 3, or when signal conditions at the edge of Cell #2 prevent the mobile device 3 from successfully receiving (or responding to) paging signalling in that cell.

Beneficially, if the anchor base station 5b does not receive any response from the mobile device 3 within a predefined time interval (after start of paging), the base station 5b requests the MME 9 to initiate S1 based (legacy) paging procedures. However, before the MME 9 is able to provide assistance in this respect, the MME 9 needs to move the mobile device 3 from connected state to idle state (e.g. ECM-CONNECTED to ECM-IDLE). In order to allow this, the base station 5b is configured to use legacy signalling in order to tear down the existing S1 connection. For example, the base station 5b may be configured to send an appropriately formatted message (such as a 'UE Context Release Request' and/or the like) including information indicating that S1 based paging is required for the mobile device 3 in its last recorded tracking area. Beneficially, the base station's request allows the MME 9 to move the mobile device 3 to idle state (ECM-IDLE) allowing the MME 9 to trigger a legacy S1-based paging. Advantageously, the message from the base station 5b may also indicate that the paging is requested without triggering a release of the mobile device's 3 bearer via the S-GW 10 (i.e. unlike the conventional procedure upon receipt of a UE Context Release Request for a UE in legacy RRC idle state).

The MME 9 triggers S1 based paging and waits for an appropriate response from the mobile device 3. In this example, the mobile device 3 responds to the MME's paging request via the new base station 5c by performing appropriate RRC and S1 connection setup procedures (via the new base station 5c/Cell #2). This is possible when a new base station 5 does not know or understand as to how to locate the associated UE context using the UE identifier (e.g. Resume ID) received from the mobile device 3. The MME 9 registers Cell #2 as the mobile device's 3 new location.

When the new base station 5c establishes a new RRC and S1 connection for the mobile device 3, the MME 9 is beneficially able to indicate to the new base station 5c that data forwarding from the old (anchor) base station 5b is to happen. In this example, the MME 9 requests data forwarding in its response to the anchor base station 5b (e.g. a 'UE Context Release Response' and/or the like).

Moreover, the MME 9 may also be configured to monitor (preceding) handovers performed by the mobile device 3 and obtain context information and other parameters relating to the mobile device 3. Therefore, the MME's 9 message to the new base station 5c may also include information (previously obtained or held by the MME 9) that may be used by the new base station 5c to fetch the UE context from the anchor base station 5b. Similarly, the MME 9 is able to provide information relevant to the anchor base station 5b in order to perform data forwarding.

On the other hand, in case the mobile device 3 is not found (i.e. it does not respond to the network-wide S1 based paging either), then the MME 9 can follow appropriate legacy procedures in order to release the UE context (held at the anchor base station 5b and the MME 9) and trigger a release of the access bearer towards the S-GW 10. After the UE context is released, the mobile device 3 is considered to be in RRC idle state (instead of LC state) and the mobile device 3 is able to communicate with the network again by moving to RRC connected state, e.g. by triggering an appropriate RRC connection establishment operation (instead of a simple resume operation).

In a particularly beneficial example, the base stations 5 may be configured to notify the MME 9 that certain operations are not possible for the mobile device 3 because it is currently operating in LC state. Such MME operations may include, for example, load balancing, TAU required, Power Saving Mode, MT CSFB, and/or the like. Thus, even if the MME 9 continues to see the mobile device 3 as being in a connected state (S1 connected/ECM-CONNECTED), the MME 9 is able to avoid such procedures.

Beneficially, the serving/anchor base station 5 (in this example, the base station 5b) is configured to send, to the MME 9, information identifying whether the mobile device 3 is operating in LC state and/or whether certain MME operations are to be avoided (or banned). Based on the received information, the MME 9 takes different handling for certain operations such as CSFB or will not release S1 with load balancing TAU required. As a result, when overloaded, the MME 9 may be configured to release S1 connections that do not belong to those UEs that are in LIGHT-CONNECTED mode.

Beneficially, the above procedures allow the MME 9 to avoid performing and/or requesting procedures that would otherwise be inappropriate for the current operating state of the mobile device 3.

In order to facilitate swift resuming of an RRC connection for mobile devices 3 via a different based station (in this example, resuming the mobile device's connection via base station 5c and Cell #2), the base stations 5 of this system may also be configured to exchange information with each other relating to the mobile devices 3 (users) for which they act as an anchor base station.

Specifically, the base stations 5 (at least the ones which operate as anchor base stations) may be configured to provide, to their neighbour base station(s) over the X2 interface, information identifying any UE AS context, security data, suspended bearers at that particular base station 5, and/or the mobile devices 3 associated with such suspended bearers.

Using such exchanged information (e.g. identifiers of suspended bearers and/or mobile devices associated with such bearers), neighbour base stations 5 are beneficially able to pre-fetch the associated UE context for bearers suspended at another (anchor) base station. This allows them to minimise latency at the time of handover (or idle mode mobility) of a particular mobile device 3 to a cell operated by the new (neighbour) base station 5 (because the UE context is already available locally at the new base station 5). This may be useful for ultra-reliable low latency communications.

In summary, in this network it is possible to provide better service continuity and more efficient resource usage at user equipment (the mobile device and/or the IoT device), base stations, and the MME when the user equipment (which may be operating in LC state) moves to and/or camps on a new cell operated by a different base station.

Mobile Device

FIG. 2 is a block diagram illustrating the main components of the mobile device 3 shown in FIG. 1 (e.g. a mobile telephone or an IoT device). As shown, the mobile device 3 has a transceiver circuit 31 that is operable to transmit signals to and to receive signals from a base station 5 via one or more antenna 33. The mobile device 3 has a controller 37 to control the operation of the mobile device 3. The controller 37 is associated with a memory 39 and is coupled to the transceiver circuit 31. Although not necessarily required for its operation, the mobile device 3 might of course have all the usual functionality of a conventional mobile telephone (such as a user interface 35) and this may be provided by any one or any combination of hardware, software and firmware, as appropriate. Software may be pre-installed in the memory 39 and/or may be downloaded via the telecommunications network or from a removable data storage device (RMD), for example.

The controller 37 is configured to control overall operation of the mobile device 3 by, in this example, program instructions or software instructions stored within the memory 39. As shown, these software instructions include, among other things, an operating system 41, a communications control module 43, a UE state module 45, an RRC module 46, and a NAS module 49.

The communications control module 43 is operable to control the communication between the mobile device 3 and its serving base station 5 (and other communication devices connected to the serving base station 5, such as further mobile devices, IoT devices, core network nodes, etc.).

The UE state module 45 is responsible for managing an operating state of the mobile device 3 (e.g. by obtaining appropriate configuration (such as state transition timer(s), information identifying a RAN paging area) and information identifying UE location, cell information, etc.) and control the other modules (e.g, the RRC module 46 and the NAS module 49) according to the current operating state of the mobile device 3.

The RRC module 46 is operable to generate, send and receive signalling messages formatted according to the RRC standard. For example, such messages are exchanged between the mobile device 3 and its serving base station 5. The RRC messages may include, for example, messages relating to establishing/resuming an RRC connection with an appropriate base station 5.

The NAS module 49 is operable to generate, send and receive signalling messages formatted according to the NAS standard. For example, such messages are exchanged between the mobile device 3 and the MME 9 (via the serving base station 5, using the RRC module 46). The NAS messages may include, for example, messages relating to registering and/or updating a tracking area (or cell) where the mobile device 3 is currently located.

Base Station

FIG. 3 is a block diagram illustrating the main components of a base station 5 shown in FIG. 1. As shown, the base station 5 has a transceiver circuit 51 for transmitting signals to and for receiving signals from user equipment (such as the mobile device 3/IoT device 3') via one or more antenna 53, a core network interface 55 (e.g. an S1 interface, NG-C interface, and/or the like) for transmitting signals to and for receiving signals from the core network 7, and a base station interface 56 (e.g. an X2 interface, Xn interface, and/or the like) for transmitting signals to and for receiving signals from neighbouring base stations. The base station 5 has a controller 57 to control the operation of the base station 5. The controller 57 is associated with a memory 59. Although not necessarily shown in FIG. 3, the base station 5 will of course have all the usual functionality of a cellular telephone network base station and this may be provided by any one or any combination of hardware, software and firmware, as appropriate. Software may be pre-installed in the memory 59 and/or may be downloaded via the telecommunications network 1 or from a removable data storage device (RMD), for example. The controller 57 is configured to control the overall operation of the base station 5 by, in this example, program instructions or software instructions stored within the memory 59. As shown, these software instructions include, among other things, an operating system 61, a communications control module 63, a UE state module 65, an RRC module 66, an X2 module 67, and an S1AP module 68.

The communications control module 63 is operable to control the communication between the base station 5 and user equipment (mobile device 3/IoT device 3') and other network entities that are connected to the base station 5. The communications control module 63 also controls the separate flows of downlink user traffic (via associated data radio bearers) and control data to be transmitted to the communication devices associated with this base station 5 including, for example, control data for managing operation of the mobile device 3 and/or the IoT device 3'.

The UE state module 65 is responsible for managing and monitoring the operating states of mobile devices 3 served by the base station 5 (e.g. by generating and sending appropriate configuration, such as state transition timer(s), information identifying a RAN paging area, etc.) and, when appropriate, providing information on the current operating state of a particular mobile device 3 to other nodes (e.g. the MME 9).

The RRC module 66 is operable to generate, send and receive signalling messages formatted according to the RRC standard. For example, such messages are exchanged between the base station 5 and the mobile device 3 (and other user equipment within the cell of the base station 5). The RRC messages may include, for example, messages relating to establishing/resuming an RRC connection for a particular mobile device 3.

The X2 module 67 is operable to generate, send and receive signalling messages (X2/Xn messages) formatted according to the X2AP (or XnAP) standard. The X2/Xn messages may include, for example, messages relating to paging a mobile device 3, data forwarding, transferring/fetching of UE context (and other information relating to the mobile device 3) between neighbouring base stations.

The S1AP module 68 is operable to generate, send and receive signalling messages formatted according to the S1AP (or NG-C AP) standard. For example, such messages are exchanged between the base station 5 and the mobility management entity (MME) 9. The S1AP messages may include, for example, messages relating to registering the location and/or operating state (e.g, LC) of user equipment in a cell of the base station and/or associated responses.

Mobility Management Entity

FIG. 4 is a block diagram illustrating the main components of the mobility management entity (MME) 9 shown in FIG. 1. As shown, the mobility management entity 9 has a transceiver circuit 71 for transmitting signals to and for receiving signals from the base stations 5 (and/or communication devices connected to the base stations 5) via a base station interface 75 (e.g. an S1 interface). The mobility management entity 9 has a controller 77 to control the operation of the mobility management entity 9. The controller 77 is associated with a memory 79. Although not necessarily shown in FIG. 4, the mobility management entity 9 will of course have all the usual functionality of a cellular telephone network mobility management entity and this may be provided by any one or any combination of hardware, software and firmware, as appropriate. Software may be pre-installed in the memory 79 and/or may be downloaded via the telecommunications network 1 or from a removable data storage device (RMD), for example. The controller 77 is configured to control the overall operation of the mobility management entity 9 by, in this example, program instructions or software instructions stored within the memory 79. As shown, these software instructions include, among other things, an operating system 81, a communications control module 83, a UE state/location registration module 85, an S1AP module 88, and a NAS module 89.

The communications control module 83 is operable to control the communication between the mobility management entity 9 and the base stations 5, mobile devices 3, IoT devices, and other network entities that are connected to the mobility management entity 9.

The UE state/location registration module 85 is responsible for keeping track of current location and state (e.g. idle or connected) of user equipment connected to the MME 9.

The S1AP module 88 is operable to generate, send and receive signalling messages formatted according to the S1AP (or NG-C AP) standard. For example, such messages are exchanged between the mobility management entity 9 and connected base stations 5. The S1AP messages may include, for example, messages relating to registering the location and/or operating state (e.g. LC) of user equipment in a cell of the base station, requesting data forwarding, requesting path switching, and/or associated responses.

The NAS module 89 is operable to generate, send and receive signalling messages formatted according to the NAS standard. For example, such messages are exchanged between the MME 9 and the mobile device 3 (via a base station 5, using the S1AP module 88). The NAS messages may include, for example, messages relating to registering and/or updating a tracking area (or cell) where the mobile device 3 is currently located.

In the above description, the mobile device 3, the base station 5, and the mobility management entity 9 are described for ease of understanding as having a number of discrete modules (such as the communications control modules and the UE state modules). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities. These modules may also be implemented in software, hardware, firmware or a mix of these.

A more detailed description will now be given (with reference to FIGS. 5 to 7) of the scenario discussed above where a mobile device operating in LC state moves between cells operated by different base stations.

OPERATION—FIRST EXAMPLE

FIG. 5 is a timing diagram (message sequence chart) illustrating an example process performed by components of the network 1 when performing a paging operation for a mobile device (UE or IoT device) operating in LC state.

It will be appreciated that in this example, the new base station 5c is a base station configured in accordance with Rel-14 standards (or later) and hence it supports user equipment operating in LC mode.

Initially, the mobile device 3 operates in LC state and its previous serving base station 5b acts as an anchor base station for the mobile device 3. Accordingly, the anchor base station 5b (using its UE state module 65) stores the UE context associated with the mobile device 3 and configures an appropriate RAN based paging area for the mobile device 3 (e.g. by providing a list of cells and/or paging area IDs to the mobile device 3) while terminating S1. When the mobile device 3 leaves the area (Cell #1) served by the anchor base station 5b (and/or the signal conditions in Cell #1 deteriorate), the mobile device 3 selects a new cell to camp on that has more favourable signal conditions. In this example the mobile device 3 selects and camps on Cell #2 which is operated by the base station 5c. Since the mobile device 3 has no active connections with the radio access network, the anchor base station 5b is not aware of the mobile device's 3 current location (Cell #2). From the perspective of the anchor base station 5b, therefore, the mobile device 3 is deemed to be idle (in LC state).

Whilst the mobile device 3 is deemed to be operating in the LC state, the MME 9 (using its UE state/location registration module 85) maintains an associated S1 connection (ECM-CONNECTED state) even when the mobile device 3 is operating in an idle triode from the RAN's point of view (which may not be visible by the MME 9). Accordingly, as generally shown in steps S501a and S501b, when the MME 9 has downlink data to send to the mobile device 3 (e.g. control-plane signalling/user-plane data), the MME 9 (using its S1AP module 88) starts transmitting the downlink data to the anchor base station 5b without performing paging. It will also be appreciated that in some cases, a different core network node, e.g. the S-GW 10 may transmit downlink data to the anchor base station 5b.

In response to receiving the downlink data from the MME 9, the controller 57 of the anchor base station 5b triggers, in step S502, RAN-based paging, which typically involves transmitting paging signalling via the Uu interface, via the X2 interface, or both. In step S503, the anchor base station 5b performs RAN based paging of the mobile device 3 within the paging area that is appropriate for that mobile device 3. Although not shown in FIG. 5, the anchor base station 5b may also send appropriate X2 paging signalling to its neighbour base station(s) 5 in order to attempt to reach the mobile device 3 via neighbour cells. Effectively, the RAN based paging indicates to the mobile device 3 that it needs to resume its RRC connection (re-connect) via the anchor base station 5b or another appropriate base station for receiving the downlink data.

At the start of the paging, the anchor base station 5b starts an appropriate timer (e.g. a paging timer) and stores the downlink data from the MME 9 (or S-GW 10) in its local cache (memory 59).

In this example, the mobile device 3 is unable to receive (or respond to) the paging signalling. This might happen, for example, when the anchor base station 5b does not perform paging via its neighbours (even though Cell #2 may belong to the currently configured RAN paging area), when Cell #2 does not belong to the paging area configured for the mobile device 3, or when signal conditions at the edge of Cell #2 prevent the mobile device 3 from successfully receiving (or responding to) paging signalling in that cell.

As generally shown in step S504, if the anchor base station 5b does not receive any response front the mobile device 3 within a predefined time interval (e.g. at expiry of the paging timer), the base station 5b proceeds to requesting help from the MME 9.

Specifically, the anchor base station 5b generates and sends, in step S505, and appropriately formatted S1 signalling message (such as a 'UE Context Release Request' and/or the like) requesting the MME 9 to initiate S1 based (legacy) paging procedures. As shown in FIG. 5, the message from the base station 5b may also indicate (or it may be interpreted such) that the MME 9 does not need to trigger a release of the mobile device's 3 hearer via the S-GW 10.

However, before the MME 9 can proceed to assist the base station 5b (e.g. by initiating a network-wide paging procedure), the MME 9 needs to align the UE state from connected to idle (ECM-CONNECTED to ECM-IDLE). Therefore, upon receipt of the message at S505, the MME 9 (using its UE state/location registration module 85) moves the S1 connection for the mobile device 3 into idle (e.g. ECM-IDLE) and then it proceeds to initiating legacy paging procedures in the last know tracking area of the mobile device 3 in step S506. Therefore, the MME 9 generates (using its S1AP module 88) and sends, in step S507, and appropriately formatted paging request to the base stations 5 operating cells that belong to the last know tracking area (including the new base station 5c).

As shown, the MME's paging request triggers the new base station 5c to carry out, in step S508, appropriate paging for the mobile device 3 over the Uu interface (in Cell #2). However, as shown in FIG. 5, the MME 9 and the S-GW 10 do not carry out a 'Release Access Bearer' procedure, i.e. the MME 9 maintains the existing S1 bearer for the mobile device 3 via the S-GW 10 despite having received a UE Context Release Request from the base station 5a.

After triggering the S1 based paging, the MME 9 waits for a response from the mobile device 3. In this example, as generally shown in step S509, the mobile device 3 responds to the Uu paging request by the new base station 5c by performing appropriate RRC and S1 connection setup procedures (via Cell #2). Typically, step S509 involves the mobile device 3 (using its NAS module 49) generating and sending an appropriately formatted handover request to the MME 9 (via the new base station 5c). Using its UE state/location registration module 85, the MME 9 registers Cell #2 as the mobile device's 3 new location. As part of step S509, the MME 9 may also indicate (for example, in an appropriately formatted 'Initial Context Setup request' and/or the like) to the new base station 5c that data forwarding from the anchor base station 5b to the new base station 5c is imminent so that the new base station 5c is able to prepare appropriate resources for receiving the forwarded data.

Beneficially, the MME 9 may be configured to monitor (preceding) handovers performed by the mobile device 3 and obtain (hold in memory 79) context information and other parameters relating to the mobile device 3. Therefore, the MME's 9 message to the new base station 5c may also include one or more of the following information held by the MME 9: an appropriate identifier associated with the mobile device 3 (e.g. a Resume Id) that the new base station 5c may use for context fetching; information identifying the mobile device 3 at the MME 9 over the S1 interface (e.g. 'MME UE S1AP ID'); information identifying the anchor base station 5b (e.g. an 'anchor eNB ID'); a TAC of the anchor base station 5b; a Globally Unique MME ID (GUMMEI) associated with the MME 9 currently serving the mobile device 3, a handover restriction list (e.g. a list of cell identifier for cells to which a handover of the mobile device 3 is not allowed), and other parameter found in previously handled handover requests relating to the mobile device 3.

Similarly, the MME 9 is able to provide information relevant to the anchor base station 5b in order to perform data forwarding. Thus, in step S510, the MME 9 requests the anchor base station 5b to perform data forwarding by generating and sending an appropriate S1 signalling message to the anchor base station 5b (e.g. a 'UE Context Release Command' and/or the like). In this example, the MME 9 sends the UE Context Release Command to the anchor base station 5b and includes information identifying the new base station 5c (e.g. an eNB ID/gNB ID) and information identifying an appropriate forwarding address for the new base station 5c (e.g. a tunnel endpoint identifier (TEID) and/or the like). The new base station 5c is thus able to trigger an appropriate procedure (e.g. by generating and sending a 'Retrieve UE Context Request' to the anchor base station 5b) in order to fetch the context relating to the mobile device 3 from the anchor base station 5b. Although not shown in detail in FIG. 5, the anchor base station 5b generates and transmits an appropriately formatted 'Retrieve UE Context Response' to the new base station 5c including e requested UE context.

After a successful X2-based (or S1-based) context retrieval, the base stations 5 proceed to SN Status transfer and data forwarding. Specifically, the anchor base station 5b (using its X2 module 67) generates and sends, in step S511, and appropriate 'SN Status transfer' message in order to transfer the status of the transceiver (uplink receiver status/downlink transmitter status) relating to the mobile device 3. It will be appreciated that the status of the transceiver may include respective Packet Data Convergence Protocol (PDCP) sequence numbers (SNs) used in the uplink and downlink direction which allow the new base station 5c to preserve the status following the mobile device 3 resuming its connection with the network via Cell #2.

In step S512, the anchor base station 5b (using its X2 module 67) starts forwarding, to the new base station 5c using the forwarding address provided by the MME 9, any cached downlink data, and the new base station 5c relays the forwarded data (not shown in FIG. 5) to the mobile device 3 via the Uu interface.

As generally shown in step S513, the MME 9 and the new base station 5c also initiates an appropriate path switch procedure (comprising a 'Path Switch Request' including information identifying the path to be switched (e.g. in an 'MME UE S1AP ID' information element) and an associated acknowledgement). In response to the path switch procedure the MME 9 also requests, in step S514, the S-GW 10 to modify the hearer associated with the mobile device 3 (i.e. to tunnel data to the new base station 5c instead of the anchor base station 5b). Once the bearer has been modified, there is no need for the anchor base station 5b to forward downlink data to the new base station 5c.

After the path switch triggered by new base station 5c (in step S513), the new base station 5c is able to trigger UE context release towards the old (anchor) base station 5b. In more detail, after switching the path (S1 connection) associated with the mobile device 3 from the anchor base station 5b to the new base station 5c, the new base station 5c generates and sends, in step S515, a UE Context release message indicating to the anchor base station 5b that the anchor base station 5b no longer needs to store the UE context associated with the mobile device 3. Effectively, this message prompts the anchor base station 5b to delete the UE context associated with the mobile device 3 (e.g. after transferring the UE context to the new base station 5c) and thus the new base station 5c becomes the new anchor base station for the mobile device 3. In step S516, the former anchor base station 5b confirms that the UE context release has been completed by generating and sending an appropriate S1 acknowledgement to the MME's 9 command.

OPERATION—SECOND EXAMPLE

FIG. 6 is a timing diagram (message sequence chart) illustrating another example process performed by components of the network 1 when performing a paging operation for a mobile device (UE or IoT device) operating in LC state. In this example, which is a modification of the example described with reference to FIG. 5, the new base station 5c is a base station configured in accordance with pre-Rel-14 standards (and hence it is not capable of receiving forwarded data from the anchor base station 5*b*). Therefore, in this example, the anchor base station 5*b* is configured to forward any cached data to the S-GW 10.

Steps S601*a* to S608 correspond to steps S501*a* to S508 described above hence their description is omitted herein for brevity.

However, in this example, after the MME 9 sending a paging request to the new base station 5*c* (in step S607) and the new base station 5*c* paging the mobile device 3 via the Uu interface (in step S608), the MME 9 and the mobile device 3 proceed to step S609, and the mobile device 3 performs a legacy RRC connection establishment procedure in order to receive its downlink data.

In more detail, the mobile device 3 responds to the paging on the Uu interface by initiating and performing appropriate RRC (with the new base station 5*c*) and S1 (with the MME 9 through the new base station 5*c*) connection setup procedures (e.g. because base station 5*c* is a pre-Rel-14 base station). The MME 9 (using its controller 77) also determines that the current serving cell (Cell #2) of the mobile device 3 is operated by a base station 5*c* which is configured in accordance with pre-Rel-14 standards.

Therefore, in step S610, the MME 9 (using its S1AP module 88) generates and sends a UE Context Release Command (and/or the like) to the anchor base station 5*b*, requesting the anchor base station 5*b* to perform data forwarding to the S-GW 10.

Accordingly, in step S612, the anchor base station 5*b* starts data forwarding to the S-GW 10 (for delivery to the mobile device 3 via the S-GW 10 using the new S1 connection established for the mobile device 3 via Cell #2). Beneficially, even though the new base station 5*c* is a pre-Rel-14 base station, downlink data intended for the mobile device 3 and that has been already sent to the anchor base station 5*b* can still be delivered to the mobile device 3 via the S-GW 10 using the new S1 connection that was set up in step S609. It is possible therefore to avoid loss and/or unnecessary retransmissions of the downlink data for the mobile device (UE or IoT device) operating in LC state.

In step S616, the anchor base station 5*b* releases the UE context, as requested, then it generates and sends an appropriate response to the MME's 9 request received at step S610.

OPERATION—THIRD EXAMPLE

In another beneficial example, the base stations 5 may be configured to notify the MME 9 that certain operations are not possible for the mobile device 3 because it is currently operating in LC state. Such MME operations may include, for example, load balancing, TAU required, PSM, MT CSFB, and/or the like. In this case, therefore, even if the MME 9 continues to see the mobile device 3 as being in a connected state (S1 connected/ECM-CONNECTED), the MME 9 is able to avoid such procedures (which would most likely fail or be ineffective).

Beneficially, the serving/anchor base station 5 (in this example, the base station 5*b*) is configured to send, to the MME 9, information identifying whether the mobile device 3 is operating in LC state and/or whether certain MME operations are to be avoided (or banned). For example, this information may be included in an appropriately formatted information element (IE) associated with the mobile device 3, such as an IE of an appropriate UE associated signalling message, such as a 'UE Status Notification' message and/or the like.

It will be appreciated that the IE may include information identifying the mobile device 3 (e.g. an 'MME UE S1AP ID' and/or an 'eNB UE S1AP ID') and information indicating that certain MME operations are not possible for that particular device. The information indicating that certain MME operations are not possible may comprise: a flag (1-bit) indicating that certain pre-configured MME operations are banned for identified mobile device 3; and/or an enumerated list (and/or the like) identifying the particular operations that are not possible for the mobile device 3. The contents of an exemplary IE are shown in Table 1.

TABLE 1 an exemplary IE indicating banned MME operations

| IE/Group Name | Presence | Range | IE type and reference | Semantics description | Criticality | Assigned Criticality |
|---|---|---|---|---|---|---|
| Message Type | M | | 9.2.1.1 | | YES | reject |
| MME UE S1AP ID | M | | 9.2.3.3 | | YES | reject |
| eNB UE S1AP ID | M | | 9.2.3.4 | | YES | reject |
| MME Operation banned List/flag | | | | List of MME operations that are banned on this UE | | |

Beneficially, the above procedures allow the MME 9 to maintain information on the accurate state/location of the mobile device 3 even when the mobile device 3 operates in the LC state. Accordingly, the MME 9 can avoid performing and/or requesting procedures that would otherwise be inappropriate for the current operating state of the mobile device 3. In the case of CSFB, for example, the MME 9 may be configured to avoid responding positively to the node initiating CSFB (e.g. an MSC) straight away—instead, the MME 9 may be configured to wait until it receives updated information from base station (e.g. that the mobile device 3 is no longer in LC state and/or CSCF is no longer banned for that particular mobile device 3).

OPERATION—FOURTH EXAMPLE

In order to reduce any potential delay caused by the need to resume a mobile device's connection via a different based station than its anchor base station (in this example, resuming the mobile device's 3 connection via base station 5c and Cell #2), the base stations 5 of this system are beneficially configured to exchange information with each other relating to the mobile devices 3 (users) for which they are configured to act as an anchor base station.

Specifically, the base stations 5 (at least the ones which operate as an anchor base station) are configured to provide, to their neighbour base station(s), information identifying any suspended bearers, UE AS context, security context at that particular base station 5, and/or the mobile devices 3 associated with such suspended bearers. Alternatively, each anchor base station 5 may be configured to exchange (via X2) the unique identifiers that identify each UE for other neighbours for performing context pre-fetch.

It will be appreciated that each base station 5 may hold (in its associated UE state module 65) information relating to bearers/mobile devices served by that base station. Such information may include, for example, an associated identifier (e.g. a 'UE RRA Identifier', a 'Resume ID', and/or the like) used within the RAN routing area (RRA).

For example, for any base station 5 to be able to uniquely identify a particular UE and to determine as to where to fetch the associated context from, an appropriate identifier may be constructed using the RAN Routing Area ID/tracking area code (TAC) of the anchor base station 5b, an identifier of the base station itself (e.g. an eNB ID/gNB ID), and a random number (e.g. a binary number).

Using appropriate X2 signalling, neighbour base stations 5 (anchor base stations) may be configured to exchange the identities of UEs being anchored by them. Anchor base stations 5 may also exchange their respective RAN Routing Area Identifiers used for the anchored mobile devices 3 (at least with their neighbours within the same RAN Routing Area).

Beneficially, using the information relating to mobile devices 3 anchored by their neighbours, each base station 5 may be configured to pre-fetch each UE context in order to minimize latency at the time of handover or idle mode mobility of these mobile devices 3.

Context pre-fetching may be applied to all anchored mobile devices. Alternatively, context fetching may be applied selectively, e.g. to mobile devices 3 of a specific type (e.g. MTC/IoT devices only). When network sharing/slicing is in place, context pre-fetching may be applied to mobile devices 3 accessing a certain network slice/type of network slice (e.g. Slice Network Template) and/or mobile devices 3 belonging to certain tenant types. Moreover, context pre-fetching may also be applied selectively to stationary/non-stationary UEs (as appropriate).

It will be appreciated that context pre-fetching may be particularly useful for Ultra-Reliable and Low Latency Communications (URLCC) use cases.

Pre-fetching and maintaining a common RRA UE Identifier pool within a RRA (using identifiers constructed as described above) also allows the base stations to address mobile devices 3 uniquely within an RRA. By constructing appropriate RRA identifiers that are unique per UE (across different cells/base stations within an RRA) cell update and mobility (in idle or connected mode) become easier and can be performed with a sufficiently low latency even for mobile devices operating in the LC state.

Modifications and Alternatives

Detailed example embodiments have been described above. As those skilled in the art will appreciate, a number of modifications and alternatives can be made to the above example embodiments whilst still benefiting from the inventions embodied therein. By way of illustration only a number of these alternatives and modifications will now be described.

It will be appreciated that example embodiments of the invention may be particularly beneficial for Internet of Things (or machine-type) data transmissions (e.g. transmission of data acquired during measurement events and the like). However, it will be appreciated that the example embodiments are also beneficially for transmission of any form of data depending on the application in which the communication device is being used. For example, the above example embodiments may be applicable for transmitting data such as user data, backup data, synchronisation data, diagnostic data, monitoring data, usage statistics, error data and/or the like.

In FIG. 1, an X2 interface is provided between two neighbouring base stations and an S1 interface is provided between each base station and the core network. However, it will be appreciated that in other systems, a different base station to base station interface and/or a different base station to core network interface may be provided. For example, in 5G systems the interface between neighbouring base stations is referred to as the 'Xn' interface and the interface between a base station and the core network is referred to as the 'NG-C' interface. In 5G systems, base stations are referred to as gNBs.

In the above example embodiments, a 3GPP radio communications (radio access) technology is used. However, any other radio communications technology (i.e. WLAN, Wi-Fi, WiMAX, Bluetooth, etc.) can be used for managing transmissions of IoT devices in accordance with the above example embodiments. The above example embodiments are also applicable to 'non-mobile' or generally stationary user equipment.

In the above description, the mobile device, the base station, and the MME are described for ease of understanding as having a number of discrete functional components or modules. Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

In the above example embodiments, a number of software modules were described. As those skilled in the art will appreciate, the software modules may be provided in compiled or un-compiled form and may be supplied to the base station, to the mobility management entity, to the mobile/IoT device, or to other user equipment as a signal over a computer network, or on a recording medium. Further, the functionality performed by part or all of this software may be performed using one or more dedicated hardware circuits. However, the use of software modules is preferred as it facilitates the updating of the base station, the mobility management entity, or the mobile device in order to update their functionalities.

It will be appreciated that the above described UE Status Notification may be implemented as a 'class-1' procedure requiring a response as well (from the MME to the base station sending the UE Status Notification). Alternatively, it may be implemented as a 'class-2' procedure requiring only a notification from the base station (but no response from the MME).

In the above described fourth example, the base stations are configured to exchange information with each other in order to facilitate a swift resumption of anchored mobile devices connection. In another example, the base station may assist a mobile device in order to speed up the transition between LC mode and connected mode. Specifically, the base station may provide appropriate random access channel (RACH) preample information to the mobile device (e.g. whilst in connected mode) for use by the mobile device when it needs to transit to connected mode (e.g. when the mobile device has new uplink data to send after a period of inactivity). It will be appreciated that the RACH preample may be specific to a particular mobile device so that the base station is able to retrieve the associated UE context upon receipt of the preamble (i.e. in the early phase of connection resumption). Thus, by transmitting the appropriate (pre-allocated) RACH preamble at the time of resuming its connection, the mobile device is able to transition from LC mode to connected mode without unnecessary delay.

In one option, the base station may provide the RACH preamble to the mobile device when the mobile device is brought (by the base station) to LC mode from connected mode. In this case, the preamble information may be encoded in an appropriate message used by the base station to instruct the mobile device to move from connected mode to LC mode. The message may comprise an RRC Connection Release message and/or the like. In another option, the preamble information may be dynamically provided to a particular mobile device at the time of a UE-terminated call for that mobile device. In this case, the message may comprise an RRA Paging message and/or the like. In yet another option, the preamble information may be dynamically provided using system information block (SIB) on-demand signalling.

The base station may also be configured to set a maximum validity for the RACH preamble allocated to the mobile device. For example, the base station may set a timer (which may be provided to the mobile device together with the allocated preamble or separately). Thus, if the mobile device remains in LC mode for longer than a threshold (measured by the timer) without making any UL/DL data transmission, the base station may move the mobile device from LC mode to idle mode (upon expiry of the timer). This beneficially allows the base station to allocated unused preambles for other mobile device (if required).

In order to assist maintaining up-to-date location information in the core network, the base station may be configured to synchronise any RRA update made by the mobile device with a corresponding tracking area update (TAU) towards the core network (MME). Specifically, when the base station receives a RRA update from a mobile device (e.g. when the mobile device moves to a new cell), the base station may be configured to map the RRA to a corresponding TA and initiate a conventional TAU on behalf of the mobile device. Beneficially, the base station may implement an appropriate local location management system per RRA (e.g. a local database mapping RRA/cell information to tracking area information). The base station may be configured to use the RRA Identifier of the mobile device in order to obtain the appropriate core network identity (e.g. a Globally Unique Temporary ID (GUTI), a Temporary International Mobile Subscriber Identity (T-IMSI), and/or the like) associated with the mobile device. The obtained core network identity is then used in the TAU request generated by the base station on behalf of the mobile device.

FIG. 7 is a timing diagram (message sequence chart) illustrating another example process performed by components of the system when resuming a connection for transmitting uplink data in LC mode. This process may be particularly beneficial for transmission of small data packets. Whilst this example is similar to the solution presented in 3GPP draft R2-165538, the RRC Connection Resume Request in this case includes information indicating whether the mobile device wishes to resume its connection for a single transmission or multiple transmissions. Accordingly, the base station is able to allocate appropriate resources and configure the mobile device accordingly. In effect, the mobile device may be able to remain in LC mode or move to connected mode only for the indicated (single or multiple) transmission(s). In this case the mobile device is also beneficially able to return to LC mode more quickly following the transmission(s).

The message (sent by the base station to the core network node) may comprise an S1AP: UE Context Release Request. The message may include at least one of i) an indication S1 paging is required for the communication device; ii) an indication that the communication device is an idle (or light-connected (LC)) condition; and/or iii) an indication that a communication bearer for the communication device should not be released.

The transceiver of the base station may be configured to receive, from the core network node (e.g. in response to said message to request initiation of a paging procedure), a message requesting the base station to initiate forwarding of the received downlink data to another node (e.g. another base station or a gateway node). In this case, the received message requesting the base station to initiate forwarding may include information identifying a new base station serving the communication device (e.g. an eNB ID and/or a forwarding address/TEID). The controller of the base station may be configured to control the transceiver to forward the downlink data to at least one of: a new base station; and a core network entity; based on said message requesting the base station to initiate forwarding.

The controller of the base station may be configured to control the transceiver to provide a context associated with the communication device to another base station as part of a context fetching procedure (e.g. an X2 based context fetching procedure). The attempt to initiate communication with the communication device may comprise attempting paging of the communication device, and said message to request initiation of a paging procedure for the communication device may be sent when the communication device does not respond to said paging.

The controller of the base station may be configured to control the transceiver to send a notification (e.g. a UE status notification) to the core network node indicating that at least one core network operation is not possible (or banned). The notification may comprise a class 1 notification requiring a response. Alternatively, the notification may comprise a class 2 notification. The notification may comprise at least one of a flag and a list indicating one or more operations that are not possible/banned.

The communication device may be in an idle state (e.g. an idle state in a lightweight connected, 'LC', mode). The base station may be configured to operate as an anchor base station for the communication device which maintains information identifying the communication device in association with context information for that communication device and/or terminates an associated S1 communication bearer for the communication device.

The controller of the base station may be configured to control the transceiver to fetch a context associated with the communication device from the other base station as part of a context fetching procedure (e.g. an X2 based context fetching procedure). The controller of the base station may be configured to control the transceiver to provide, to the core network node, a message configured to trigger initiation of a path switching procedure.

The controller of the core network apparatus may be configured to the communication device into an idle state (e.g. ECM-IDLE) from a connected state (e.g. ECM-CONNECTED) and to trigger paging in a previously known tracking area (TA). The controller may be configured to move the communication device into said idle state without releasing a communication bearer associated with the communication device.

The core network apparatus may comprise a mobility management entity ('MME').

The transceiver of the core network apparatus may be configured to send, to the base station (e.g. in response to said message to request initiation of a paging procedure), a message requesting the base station to initiate forwarding of the received downlink data to another node (e.g. another base station or a gateway node). The message requesting the base station to initiate forwarding may include information identifying a new base station serving the communication device (e.g. an eNB ID and/or a forwarding address/TEID).

The controller of the core network apparatus may be configured to control the transceiver to send, to another base station, a message (e.g. an Initial Context Setup Request) indicating that data forwarding from the base station is to happen for the communication device, together with at least one of: an identifier, associated with the communication device, for use in fetching a context relating to the communication device from the other base station; information identifying the communication device at the core network apparatus over an S1 interface (e.g. 'MME UE S1AP ID'); information identifying the base station (e.g. an 'anchor eNB ID'); a tracking area code (TAC) associated with the base station; a globally unique ID (e.g. a GUMMEI) associated with the core network apparatus; information identifying at least one cell identifier for at least one cell to which a handover of the communication device is prohibited; and at least one other parameter acquired by the core network apparatus in a previously handled handover request relating to the communication device.

The controller of the core network apparatus may be configured: to control the transceiver to receive, from another base station, a message configured to trigger initiation of a path switching procedure; and to initiate the path switching procedure accordingly. The message configured to trigger initiation of a path switching procedure may comprise an MME UE S1AP ID IE for the communication device.

Various other modifications will be apparent to those skilled in the art and will not be described in further detail here.

The following is a detailed description of the way in which some of the above procedures may be implemented in the currently proposed 3GPP standard. Whilst various features are described as being essential or necessary, this may only be the case for the proposed 3GPP standard, for example due to other requirements imposed by the standard. These statements should not, therefore, be construed as limiting the present invention in any way.

1 INTRODUCTION

In RAN3 #93bis, it was argued that RAN-based paging might fail and hence, there has to be a mechanism in place for an eNB to seek MME for paging assistance. Although it may seem that RAN-based paging may not fail unless UE is switched off, failed or has slipped out of cellular coverage, it is better to have a fall back mechanism for the purpose of getting an eNB to resort to CN-based paging, if necessary. Although some basic solutions were presented in RAN3 #93bis, it is better to look into it in depth in order to make it proper.

The objective of this paper is to make a CN-based paging work if sought by an eNB. Further it explores, the various ways to make such a CN-based paging to work especially in mixed-deployment cases.

2 DISCUSSION 2.1 Conserving Network Resource

Although different companies put forward arguments that are in favour of or against RAN-based paging, the basic tenet was to reduce core signalling by hiding UE state transitions between the legacy and new states. Although signalling can be minimised on S1, resources would be permanently allocated for a UE especially on S1 together with active state maintenance. This does not come for free given the fact that MME can easily be overloaded that may either trigger S1 release with a cause of Load balancing TAU required or S1 Overload Start/Stop. Given that UE does not maintain RRC connection when it takes the new LIGHT-CONNECTED State, triggering fact that MME can easily be overloaded that may either trigger S1 may defeat the purpose of this WI. Hence, it is more appropriate for an anchor eNB to release UE, context if a UE does not transmit/receive data within a time period.

Observation 1: If a UE hardly transmit/receive data, it is better for an Anchor eNB to move a UE from LIGHT-CONNECTED to RRC-IDLE State to conserve network resources.

When an anchor eNB moves a UE from LIGHT-CONNECTED to RRC-IDLE State after a time out, it can trigger S1-AP: UE Context Release Request for the purpose of releasing S1 resources and states.

Proposal 1: RAN3 is respectfully requested to ensure that a UE is not configured to take LIGHT-CONNECTED State indefinitely unless otherwise it is necessary and S1 resources are released after a time out.

2.2 Identifying a UE Uniquely Across Neighbour eNBs

For context retrieval purposes, a new or existing identifier (e.g. Resume Id) that can be used for identification purposes especially by the E-UTRAN when a UE takes LIGHT-CONNECTED State needs to be unique across neighbours. For instance when a UE tries to resume with a Resume Id that is not comprehensible to a new eNB in terms of which eNB to contact in order to fetch associated UE context. This is especially difficult when there is no X2 between an anchor eNB and a new eNB.

Observation 2: UE has to be uniquely identified across neighbour eNBs for context retrieval purposes.

If the new or existing identifier includes tracking area code (TAC) or RAN Routing Area Code (i.e. the RAN routing area code that is analogous to TAC) and eNB Id. This way a new eNB can determine the exact anchor eNB from which to fetch a UE context.

Proposal 2: RAN3 is respectfully requested to ensure that a new or existing identifier (e.g. ResumeID) includes tracking area code (TAC) or RAN Routing Area Code (i.e. the RAN routing area code that is analogous to TAC) and eNB ID.

2.3 Non-Transparent Nature of New State

It is one of the design principles that the new UE state is hidden from MME. In other words, whenever an eNB configures a UE to take this new state, it does not explicitly notify an MME. As a result, a UE which takes LIGHT-CONNECTED State is considered to be in ECM-CONNECTED mode from the perspectives of an MME. Hence, it is inappropriate for an eNB to suddenly seek an MME for CN-based legacy paging.

Observation 3: When UE takes LIGHT-CONNECTED state, it is inappropriate for an eNB to seek CN-assistance without aligning states.

Given the limited coverage size of RAN-based paging, it is always better to seek CN assistance in case an anchor eNB finds it difficult to reach out an UE for MT data. However, MME has to be brought back to the normal state in terms of how a UE in question is seen by an MME before a help of MME can be sought in this respect by an eNB.

Observation 4: MME has to be made to move a UE from ECM-CONNECTED to ECM-IDLE for triggering a legacy paging.

In other words, an MME has to move a UE from ECM-CONNECTED to ECM-IDLE mode before it can trigger a legacy-based paging. Existing procedures and messages can be used for this purpose. As it is depicted in FIG. 8, for instance, an anchor eNB can trigger a UE Context Release procedure whenever an anchor eNB cannot reach out a UE through its RAN-based paging. Using the eNB-triggered UE Context Release mechanism on S1, the anchor eNB can additionally seek MME assistance for paging while releasing S1 context. This in turn can get an MME to initiate the legacy paging and suppose a UE makes the connection/resume request from a new eNB, MME can pass those details to an old and new anchor eNB for either X2-based or S1-based context retrieval and subsequent data forwarding. In Step 9, an MME can indicate to a new eNB that data forwarding from an old anchor eNB is to happen in Initial Context Setup Request message, together with UE identifiers for context fetch (e.g. Resume Id), MME UE S1AP ID, old anchor eNB ID, TAC of an old anchor eNB and other key parameters that can be found in HO Request message. Similarly, an old anchor eNB can be notified by an MME in terms of new eNB ID, TEID and data forwarding address using existing legacy UE Context Release command. A new eNB can trigger RETRIEVE UE CONTEXT REQUEST with a passed on details of an old anchor eNB which in turn respond with RETRIEVE UE CONTEXT RESPONSE. This context fetch can happen between Steps 10 and 11 in FIG. 8 although this is not shown for clarity. After X2-based or S1-based context retrieval, SN Status transfer and data forwarding can happen. After the path switch, the new eNB can trigger UE context release towards an old anchor eNB which in turn trigger S1-AP: UE Context Release Complete.

Observation 5: Existing S1-AP: UE Context Release procedure can be used for getting an MME to move UE from the ECM-CONNECTED to the ECM-IDLE State and to trigger S1-based paging.

Proposal 3: RAN3 is respectfully requested to ensure that MME is put to the right state using existing procedures for the purpose of enabling an eNB to seek MME assistance for paging when RAN-based paging fails.

2.4 What happens When UE Moves into Legacy Area

It is difficult to ensure that a mobile network operator (MNO) rolled out completely new system within its service region. Hence, it is possible to find pockets of legacy eNB coverage. Under such circumstances, RAN-based paging can fail and it will be necessary for an anchor eNB to seek MME for paging assistance. In Step 10, an MME can request an old anchor eNB to forward data nack to S-GW. After data forwarding is complete, old anchor eNB can trigger S1-AP: UE Context Release Complete.

Observation 6: S1-based paging is necessary when a UE moves into legacy eNB area.

Proposal 4: RAN3 is respectfully requested to ensure existing procedure is used to get an old eNB to forward data back to S-GW when RAN-based paging fails in mixed deployment cases.

3 CONCLUSION AND PROPOSALS

Seeking MME assistance for paging may become necessary and this paper tries to ensure that MME states are aligned before MME assistance is sought. With this analysis, it makes the following 6 Observations and 4 proposals:

Observation 1: If a UE hardly transmit/receive data, it is better for an Anchor eNB to move a UE from LIGHT-CONNECTED to RRC-IDLE State to conserve network resources.

Proposal 1: RAN3 is respectfully requested to ensure that a UE is not configured to take LIGHT-CONNECTED State indefinitely unless otherwise it is necessary and S1 resources are released after a time out.

Observation 2: UE has to be uniquely identified across neighbour eNBs for context retrieval purposes.

Proposal 2: RAN3 is respectfully requested to ensure that a new or existing identifier (e.g. ResumeID) includes tracking area code (TAC) or RAN Routing Area Code (i.e. the RAN routing area code that is analogous to TAC) and eNB ID.

Observation 3: When UE takes LIGHT-CONNECTED state, it is inappropriate for an eNB to seek CN-assistance without aligning states.

Observation 4: MME has to be made to move a UE from ECM-CONNECTED to ECM-IDLE for triggering a legacy paging.

Observation 5: Existing S1-AP: UE Context Release procedure can be used for getting an MME to move UE from the ECM-CONNECTED to the ECM-IDLE State and to trigger S1-based paging.

Proposal 3: RAN3 is respectfully requested to ensure that MME is put to the right state using existing procedures for the purpose of enabling an eNB to seek MME assistance for paging when RAN-based paging fails.

Observation 6: S1-based paging is necessary when a UE moves into legacy eNB area.

Proposal 4: RAN3 is respectfully requested to ensure existing procedure is used to get an old eNB to forward data back to S-GW when RAN-based paging fails in mixed deployment cases.

4 REFERENCES

3GPP R3-1.62432, "On common and Specific building blocks for Light connected UEs", RAN3 #93bis, Ericsson, France, October 2016.

3GPP R3-162490, "Response to R3-162156", RAN3 #93bis, NTT DoCoMo, France, October 2016.

The invention claimed is:

1. A base station comprising:
a transceiver; and
a controller configured to:
control the transceiver to receive, from a core network, downlink data for a user equipment (UE);
perform a Radio Access Network (RAN)-based paging to the UE; and
control the transceiver to transmit, to an apparatus for mobility management in the core network, in a case where the RAN-based paging fails, a UE Context Release Request message in a release procedure that is to move a connection management (CM) state of the UE in the apparatus for mobility management to CM-IDLE, without invoking releasing a connection among the apparatus from mobility management and a gateway in the core network.

2. The base station according to claim 1, wherein the controller is configured to control the transceiver to receive the downlink data for the UE from the apparatus for mobility management.

3. An apparatus for mobility management of a core network, the apparatus comprising:
   a transceiver; and
   a controller configured to:
   control the transceiver to receive from the base station, in a case where the base station receives, from the core network, downlink data for a user equipment (UE), and a Radio Access Network (RAN)-based paging to the UE fails, a UE Context Release Request message in a release procedure that is to move a connection management (CM) state of the UE in the apparatus for mobility management to CM-IDLE, without invoking a release of a connection among the apparatus for mobility management and a gateway in the core network.

4. The apparatus according to claim 3, wherein the controller is configured to control the transceiver to transmit the downlink data for the UE to the base station.

5. A method performed by a base station, the method comprising:
   receiving, from a core network, downlink data for a user equipment (UE);
   performing a Radio Access Network (RAN)-based paging to the UE; and
   transmitting, to an apparatus for mobility management in the core network, in a case where the RAN-based paging fails, a UE Context Release Request message in a release procedure that is to move a connection (CM) state of the UE in the apparatus for mobility management to CM-IDLE, without invoking a release of a connection among the apparatus for mobility management and a gateway in the core network.

6. The method according to claim 5, wherein
   the receiving the downlink data is performed by receiving the downlink data from the apparatus for the mobility management.

7. A method performed by an apparatus for mobility management of a core network, the method comprising:
   receiving from a base station, in a case where the base station receives, from the core network, downlink data for a user equipment (UE), and a Radio Access Network (RAN)-based paging to the UE fails, a UE Context Release Request message in a release procedure that is to move a connection management (CM) state of the UE in the apparatus for mobility management to CM-IDLE, without invoking a release of a connection among the apparatus for mobility management and a gateway in the core network.

8. The method according to claim 7, further comprising:
   transmitting the downlink data for the UE to the base station.

* * * * *